United States Patent
Le Bihan et al.

(10) Patent No.: US 8,650,399 B2
(45) Date of Patent: Feb. 11, 2014

(54) MEMORY DEVICE AND CHIP SET PROCESSOR PAIRING

(75) Inventors: Joël Le Bihan, Nantes (FR); Christophe Carvounas, Le Plessis Trevise (FR); Vincent Cedric Colnot, Ivry sur Seine (FR); Elena Trichina, Munich (DE); Helena Handschuh, Paris (FR)

(73) Assignee: Spansion LLC, Sunnyvale, CA (US)

( * ) Notice: Subject to any disclaimer, the term of this patent is extended or adjusted under 35 U.S.C. 154(b) by 1127 days.

(21) Appl. No.: 12/039,941

(22) Filed: Feb. 29, 2008

(65) Prior Publication Data

US 2009/0222910 A1    Sep. 3, 2009

(51) Int. Cl.
*H04L 9/00* (2006.01)
*G06F 1/00* (2006.01)

(52) U.S. Cl.
USPC ........... 713/169; 713/168; 713/170; 713/189; 726/2; 726/19; 705/67

(58) Field of Classification Search
USPC ................ 713/169, 168, 189, 170; 705/1, 67; 726/2, 19
See application file for complete search history.

(56) References Cited

U.S. PATENT DOCUMENTS

| 7,373,509 | B2 * | 5/2008 | Aissi et al. | 713/168 |
| 2002/0095382 | A1 * | 7/2002 | Taoka et al. | 705/50 |
| 2002/0184046 | A1 * | 12/2002 | Kamada et al. | 705/1 |
| 2004/0133781 | A1 * | 7/2004 | Guillou | 713/170 |
| 2004/0230799 | A1 * | 11/2004 | Davis | 713/169 |
| 2006/0136989 | A1 * | 6/2006 | Rodriguez et al. | 726/2 |

* cited by examiner

*Primary Examiner* — Brian Shaw
(74) *Attorney, Agent, or Firm* — Turocy & Watson, LLP

(57) ABSTRACT

Systems, devices and/or methods that facilitate mutual authentication for processor and memory pairing are presented. A processor and a suitably equipped memory can be provided with a shared secret to facilitate mutual authentication. In addition, the memory can be configured to verify that the system operating instructions have not been subjected to unauthorized alterations. System integrity can be ensured according to the disclosed subject matter by mutual authentication of the processor and memory and verification of the authenticity of system operating instructions at or near each system power up. As a result, the disclosed subject matter can facilitate relatively low complexity assurance of system integrity as a replacement or supplement to conventional techniques.

19 Claims, 11 Drawing Sheets

MEMORY DEVICE AND CHIP SET PROCESSOR PAIRING

TECHNICAL FIELD

The subject innovation relates generally to memory systems and in particular to systems, devices, and methods for mutual authentication for pairing processors and memories.

BACKGROUND

A wide variety of memory devices can be used to maintain and store data and instructions for various computers and similar systems. In particular, flash memory is a type of electronic memory media that can be rewritten and that can retain content without continued consumption of power. Unlike dynamic random access memory (DRAM) devices and static random memory (SRAM) devices in which a single byte can be erased, flash memory devices are typically erased in fixed multi-byte blocks or sectors. Flash memory technology can include NOR flash memory and NAND flash memory, for example. NAND flash memory evolved from DRAM technology and NOR flash memory evolved from electrically erasable read only memory (EEPROM) chip technology, in which, unlike flash memory, a single byte can be erased. While NAND flash memory is typically suitable for sequential access to handle semi-static data storage like pictures, music, etc., NOR flash is typically suitable for random access application such as code storage where execution in place is required (e.g., including set-top box applications, personal computers, cell phones, etc.). However, NAND flash can be used for some boot-up operations as well, for example, when used in combination with other memory types (e.g., DRAM) for execute in place functionality. In addition, flash memory devices typically are less expensive and more dense as compared to many other memory devices, meaning that flash memory devices can store more data per unit area.

Flash memory has become popular, at least in part, because it combines the advantages of the high density and low cost of EPROM with the electrical erasability of EEPROM. It can be used in many portable electronic products, such as cell phones, portable computers, voice recorders, thumbnail drives, multimedia players, set top boxes (STB), and the like, as well as in many larger electronic systems, such as cars, planes, industrial control systems, etc. The fact that flash memory can be rewritten, as well as its ability to retain data without a power source, a small size, and a light weight, have all combined to make flash memory devices useful and popular means for transporting and maintaining data.

However, the ability to rewrite flash memory as well as the increasing use of flash memory in devices involving digital rights management (DRM) schemes presents special challenges for implementing the technological protection measures to ensure the integrity of the DRM schemes in such devices. For example, consider a system comprising a processor (e.g., a host processor) and an external memory (e.g., a set top box controller and memory, a cell phone processor and memory, etc.), where the system requires sustained system integrity to successfully implement DRM schemes. Such systems have to be reliably secured to prevent unauthorized access or redistribution of protected data and/or circumvention of intended technological protection measures. Further consider that the system is built in such a way that the raw external memory blocks contain crucial data or code (e.g., operating system code, private decryption keys, pseudo random number generation modules, etc.), the securing of which must be ensured to prohibit unauthorized access or modification.

Conventional solutions attempting to provide such system integrity can rely on the notion of secure booting, which in turn relies on the notion that all the system software is signed (e.g., using public key infrastructure (PKI) or otherwise) by the software issuer or other trusted party. Typically, at boot time, the system processor has to perform a series or levels of computationally intensive security checks to verify the digital signatures of the various signed software modules. Such security checks can include, for example, making sure that no other parts of software other than originally installed software is on the system.

However, such systems may still be vulnerable to attacks that can compromise system integrity for the purpose of executing unauthorized system functions (e.g., unauthorized access or redistribution of protected data). For example, one attack or compromise of the intended or authorized actions of the operating system can be to replace the memory (e.g., replacing a flash memory) with a version having compromised operating system functions (e.g., reduced security checks, unauthorized redistribution of control words, private keys, or other secret information, and/or other alterations). Another example can include operating system alterations (e.g., either automatically via execution of a virus or other code intended to exploit system vulnerabilities or otherwise) such that when a control word or other secret information is received, the operating system can be reconfigured to distribute the control word or other secret information to unauthorized recipients (e.g., to an illicit website or other unauthorized data repository), or to perform other unauthorized actions. As a result of such compromises, an attacker may be able to circumvent provider content restrictions using the compromised operating system. Thus, it is desirable to have improved technological protection measures that can thwart such attempts at compromising system integrity.

One class of responses to such attacks has been remote attestation. Remote attestation allows changes to a protected system to be detected by authorized parties. For example, changes to operating system code can be detected to prevent system execution of unauthorized code. Typically, this is performed by system hardware generating a certificate based on what code version or versions the system is currently running. The system can then present this certificate in encrypted form to an authorized remote party to facilitate whether the system code has been tampered with. An intended result is that, authorized parties can avoid user-tampering with system software to circumvent the intended technological protection measures, by taking subsequent measures if unauthorized changes are detected such as disabling the device or forcing a restoration to an authorized configuration.

Remote attestation is usually combined with PKI so that the information sent can only be read by the programs that presented and requested the attestation, and not by an eavesdropper, such as a system attacker. However, such remote attestation implementations produce relatively computationally intensive and slow systems because the process can be slowed by transmission delays, computationally complex decryption, and other response delays inherent in the process. In addition, system leakage via inadvertent execution of a virus or other code intended to exploit system vulnerabilities can result in recovery of private keys or other secret information that can be used for attestation of the integrity of the technological protection measures. This in turn can lead to wide-scale thwarting of the intended protection measures if such information is redistributed to unauthorized recipients (e.g., via the internet or otherwise). Thus, improved technological protection measures are desired, which can provide a relatively reduced complexity option to replace or supplement conventional protection measures.

The above-described deficiencies are merely intended to provide an overview of some of the problems encountered in implementing technological protection measures in memory systems and are not intended to be exhaustive. Other problems with the state of the art may become further apparent upon review of the description of the various non-limiting embodiments of the subject innovation that follows.

SUMMARY

The following presents a simplified summary of the subject innovation in order to provide a basic understanding of some aspects described herein. This summary is not intended to be an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems, methods, and devices that facilitate processor and memory pairing. According to various aspects of the subject innovation, the provided systems, methods, and devices can facilitate mutual authentication between a processor and a memory to facilitate ensuring baseline system integrity on device power up. In turn, the provided systems, methods, and devices can facilitate enforcing content provider or device manufacturer restrictions by replacing or supplementing conventional technological protection measures.

In various embodiments of the subject innovation, a method is provided that can facilitate pairing of system participants. In one aspect of the disclosed subject matter, the method can comprise authenticating a second participant (e.g. a nonvolatile memory such as a flash memory) of the system by a first participant (e.g., a processor associated with the nonvolatile memory). The method can further include authenticating the first participant by the second participant. In addition, the method can include verifying the authenticity of a set of instructions (e.g., computer instructions) and/or data associated with one of the first or second participants.

In further non-limiting embodiments of the subject innovation, the method can comprise transmitting a challenge from one of the first and second participants to the other of the first and second participants to facilitate calculating a challenge-response based in part on the challenge and a shared secret, where the shared secret can be shared at least between the first and second participants. In addition, the method can include receiving the challenge-response in the one of the first and second participants to facilitate authentication of the other of the first and second participants.

In other non-limiting embodiments of the subject innovation, a method can comprise controlling access to at least a subset of one or more nonvolatile memories based in part on the outcome of the mutual authentication and the verification of the authenticity of a set of instructions and/or data associated with one of the first or second participant (e.g., a processor associated with contents of the one or more nonvolatile memories).

In a related embodiment, a system that facilitates pairing associated with a memory is provided. According to various aspects of the disclosed subject matter, the system can include first and second authentication components. For example, the system can include a processor having an associated authentication component and configured to issue a memory-challenge. In addition, the processor can be configured to return a challenge-response upon receiving a processor-challenge. The processor can be further configured to verify the authenticity of a response to the memory-challenge. In addition the provided system can include a memory associated with the processor, and such memory can include an authentication component and can be configured to issue the processor-challenge. In addition, the memory can be configured to return the challenge-response upon receiving a memory-challenge and to verify the authenticity of a response to the processor-challenge. The memory can be further configured to verify the authenticity of the contents of a portion of the memory associated with the processor, where the contents can comprise a set of instructions and/or data associated with the processor.

The following description and the annexed drawings set forth in detail certain illustrative aspects of the disclosed subject matter. These aspects are indicative, however, of but a few of the various ways in which the principles of the subject innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
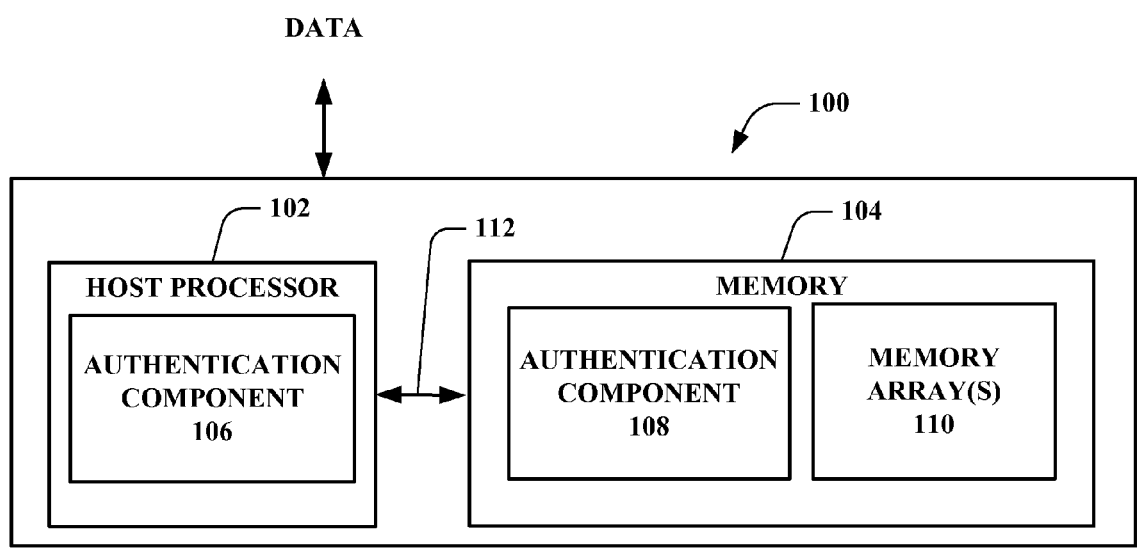
FIG. 1 illustrates a block diagram of a system that facilitates processor and memory pairing in accordance with various aspects of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

According to various non-limiting embodiments of the subject innovation, reduced complexity systems, devices, and methods for pairing processors and memories are provided. According to various embodiments, a pairing function can be based on an authentication process between a software component in a nonvolatile memory (e.g., a flash memory device) and a system processor (e.g., a host CPU). The provided pairing and mutual authentication techniques can facilitate a secure link between the memory containing an operating system and the system processor executing the operating system. As a result of using the disclosed techniques, any unauthorized changes to the operating system can cause the system processor to be unable to execute the unauthorized operating system functions. This, in turn, can facilitate enforcing various content provider or device manufacturer restrictions.

As described above, conventional technological protection measures can comprise computationally intensive measures (e.g., digital signature computation and/or verification using PKI and the like) and can be subject to certain attacks that can compromise system integrity. For example, consider a system comprising a processor and an external memory (e.g., a set top box controller and memory, a cell phone processor and memory, etc.), where the system requires sustained system integrity to successfully implement DRM schemes. In another example, a device manufacturer can desire sustained system integrity to successfully implement device manufacturer restrictions (e.g., locking of a cellular phone, implementing bandwidth restrictions in an end user network communication device such as a cable or digital subscriber line (DSL) modem, etc.). Further consider that the system is built in such a manner that the raw external memory blocks contain crucial data or code (e.g., operating system code, private decryption keys, pseudo random number generation modules, etc.), the securing of which is desired to prohibit unauthorized access or modification. Such systems have to be reliably secured to ensure system integrity to prevent unauthorized access or redistribution of protected data or circumvention of intended technological protection measures.

Conventional solutions typically rely on the notion of secure booting, which in turn relies on the notion that all the system software is signed (e.g., using public key infrastructure (PKI) or otherwise) by a software issuer or other trusted party. Typically, at boot time, the system processor performs a series or levels of computationally intensive security checks to verify the digital signatures of the various signed software modules. Such security checks can consist of, for example, making sure that no other parts of software other than originally installed software is on the system. However, in such trusted platform systems, only the processor is trusted, which does not prevent the contents of the memory from being dumped, substituted, and/or otherwise attacked.

As a result, such systems can be compromised for the purpose of executing unauthorized system functions (e.g., unauthorized access or redistribution of protected data) by, for example, replacing the memory (e.g., replacing a flash memory module) with a version having compromised operating system functions (e.g., reduced security checks, unauthorized redistribution of control words, private keys, or other secret information, and/or other alterations). In addition, a further disadvantage of these conventional solutions is the possibility of locking an end-user or a device manufacturer into a single software provider, where the software provider is the signature authority, if the software provider becomes reluctant to sign third party software modules.

Another example of compromising system integrity can include operating system alterations (e.g., executed either automatically via execution of a virus or other code intended to exploit system vulnerabilities, manually, and/or otherwise). Such alterations can, for example, dictate that when a control word or other secret information is received or stored, the control word or other secret information is to be distributed to unauthorized recipients (e.g., to an illicit website or other unauthorized data repository). As should be understood, various other unauthorized actions can be dictated once the system integrity has been compromised. As a result of such compromises, an attacker may be able to circumvent provider content restrictions or device manufacturer restrictions using the compromised system. In addition, use of remote attestation, in which hardware typically generates a certificate based on what code version or versions the system is currently running, can be subject to system leakage. Such leakage can occur via inadvertent execution of a virus or other code intended to exploit system vulnerabilities, which can result in recovery of private keys or other secret information necessary for attestation of the integrity of intended technological protection measures.

In consideration of the foregoing, the provided systems and methods for pairing processors and memory devices facilitate mutual authentication between a first participant (e.g., a processor such as a host central processing unit) and a second participant (e.g., a memory such as a nonvolatile memory), according to various aspects of the subject innovation. In various non-limiting aspects of the disclosed subject matter, pairing between a memory (e.g. a nonvolatile memory) and a processor is facilitated to prevent unauthorized actions by the processor with respect to protected data, including, but not limited to secret keys, programming control words, passwords, passkeys, encrypted multimedia content, encrypted messages or instructions, DRM protected content, data or instructions contained in a secured storage such as a hidden memory etc. Thus, by facilitating a secure link between a memory containing operating system code and a processor executing the operating system code, any unauthorized changes can be detected and cause the processor to halt execution of further unauthorized operating system functions.

As memories start to become more capable, such as for example, including general or special purpose processor functionality resident on a memory (e.g. a nonvolatile memory), this functionality can be used for management of standard memory operations (e.g. standard flash memory operations for a flash memory). In addition, the processor functionality can also be used for managing other functions such as those related to security and system integrity. Thus, in accordance with an aspect of the disclosed subject matter, a memory including such functionality is provided to facilitate, among other functions, the pairing techniques as described herein.

For example, during manufacture of a device (e.g., a device that can comprise software code in a memory and associated with a device processor), a procedure can be used to a share a secret between a processor associated with the device and the memory (e.g., a nonvolatile memory such as flash memory), thereby creating a shared secret. Accordingly, during operations of the device with the intended memory contents, such as for example, on power up of the device or within a short time thereafter, the shared secret or information derived therefrom can be mutually verified (e.g., to facilitate mutual authentication) between the processor and the memory for the purpose of ensuring system integrity (e.g., that intended system functions have not been compromised as a result of unauthorized system modifications). In accordance with a further aspect of the disclosed subject matter, if the memory contents are replaced with an unauthorized or unintended version (e.g., overwriting a memory or substituting the memory device), the processor pairing can fail, which can result in the processor halting execution of further unauthorized functions.

Advantageously, the disclosed techniques can provide reduced complexity systems, devices, and methods to ensure system integrity, which can replace or supplement the secure boot process by facilitating mutual authentication between the processor and the memory. Thus, the disclosed subject matter facilitates universal schemes for secure pairing that can provide relatively low cost and low complexity solutions for providing a root of trust. As a result, rather than using a computationally intensive trusted boot procedure (e.g., based on public key cryptography or otherwise and digital signature verification of operating system components and software), in certain circumstances the low complexity mutual authentication (e.g., based on challenge-response protocol) can be used. Alternatively, the disclosed techniques can supplement conventional procedures by providing a root layer of trust between a processor and an associated memory. Thus, the disclosed subject matter can be used in virtually any system (e.g., comprising processor and associated nonvolatile memory) that requires system integrity (e.g., has to be reliable or secured against compromise or unauthorized manipulation), and is built in such a way that the raw external memory blocks contain crucial data or code (e.g., operating system code, secret keys, control words, etc.).

For example, in the context of a set top box (STB) application, such pairing can facilitate mutual authentication between a processor (e.g., a host CPU) of a STB controller and an associated memory (e.g., a nonvolatile memory such as flash memory). The mutual authentication, for example, can ensure that at substantially the first instant of each power up (e.g., at the start of the boot process at boot time) the processor is communicating with the intended flash memory, and that the flash memory is in communication with the intended host processor (e.g., establishing a mutual trust relationship between the host processor and the memory substantially prior to execution of higher level functions). In addition, the pairing operation can facilitate ensuring that the operating system code stored in the memory is the intended version (e.g., as intended by the issuer or other trusted party) of operating system code substantially prior to continuing the system power up process.

As a result, the disclosed subject matter can facilitate the prevention of STB smartcard sharing, redistribution of set top box control word(s) or other secret information, unauthorized replacement of the memory with versions containing unauthorized modifications (e.g., compromised operating system code), bypassing pay per view restrictions, and/or the like.

While for purposes of illustration, the disclosed subject matter can be described in the context of STBs, one having ordinary skill in the art would recognize that various modifications can be accomplished according to known techniques and according to system design considerations, to implement the disclosed techniques in alternative contexts comprising a nonvolatile memory and processor where security of protected information is desired. In addition, it should be appreciated the current systems can be retrofitted to facilitate implementation of the disclosed techniques by, for example, including system components or portions thereof to accomplish the described functions.

For instance, the disclosed techniques can be applied in almost any computing system that requires system integrity to prevent unauthorized actions by the computing system. For example, a processor and a memory of a cellular device can be paired according to disclose techniques to prevent unauthorized redistribution of downloaded content, unlocking of cellular devices, etc. In a further example, a processor and a memory in an end user network communication device can be paired to facilitate enforcing implemented bandwidth restrictions, for instance, in a cable or DSL modem. In another example, the disclosed techniques can be used to pair a processor and an associated memory in a Global Positioning System (GPS) device to prevent unauthorized operating system modifications for circumventing restrictions intended to only allow authorized versions of map files to be loaded. In a further example, processor and a memory in a subscription based multimedia player (e.g., a music player, a video player, an electronic book reader, etc.) can be paired according to the disclosed subject matter to facilitate ensuring system integrity, which can in turn facilitate enforcing subscription terms.

Thus, it should be understood that the description herein is but one of many embodiments that may be possible while keeping within the scope of the claims appended hereto. It should be further understood that the disclosed techniques can replace or supplement conventional or future trusted platform techniques (e.g., such as performing integrity checks for each executed application based on digital signatures, remote attestation, etc.), by providing a reduced complexity baseline system integrity check at substantially the first instant of system power up.

Turning to FIG. 1, illustrated is block diagram of a system 100 that facilitates processor and memory pairing in accordance with various aspects of the subject matter disclosed herein. The system 100 can include a processor 102 (e.g., a host central processing unit (CPU)) and an associated memory 104 operable to receive and store data, for example, protected data, including, but not limited to, secret keys, programming control words, passwords, passkeys, encrypted multimedia content, encrypted messages or instructions, DRM protected content, data or instructions contained in a secured storage such as a hidden memory, etc.

For purposes of illustration, the system 100 is shown as comprising various components in a singular component block 100. However, it should be understood that while various components and functionality are illustrated as discrete blocks either in combination with or separate from other components and functionality, one having ordinary skill in the art would recognize that various levels of integration or separation of components and functionality may be accomplished according to known techniques and system design considerations. Thus, it should be understood that the system and device descriptions throughout are but some of the many embodiments of the disclosed subject that may be possible while keeping within the scope of the disclosed subject matter.

In accordance with an embodiment of the disclosed subject matter, the processor 102 can be a typical applications processor that can manage communications and run applications. For example, the processor 102 can be a general or special purpose processor that can be utilized by a computer, a mobile handset, personal data assistant (PDA), a set top box (STB), Global Positioning System (GPS) device, multimedia player, or other electronic device, etc. The processor 102 can execute commands, which can include read, write, and/or erase commands, in order to facilitate reading data from, writing data to, and/or erasing data from the memory 104, where the communication of information between the processor 102 and the memory 104 can be facilitated via an authentication component 106 associated with the processor 102 and an authentication component 108 associated with the memory 104. In addition, processor 102, or portions thereof, can execute algorithms and associated commands and functions to facilitate the mutual authentication of the processor 102 and the memory 104, such as described herein.

Memory 104 can include, for example, non-volatile memory, such as a flash memory device (e.g., single-bit flash memory, multi-bit flash memory, etc.). In one aspect, the flash memory can comprise NAND flash memory and/or NOR flash memory, or any combination thereof. The memory 104 can be comprised of one or more memory array(s) 110 and can include a plurality of arrayed memory cells (not shown) wherein each memory cell can store one or more bits of data. Data stored in a memory cell(s) in the memory 104 can also be read and such data can be provided as an output. In addition, according to various embodiments of the disclosed subject matter, the memory array(s) 110 can be partitioned, such that there can be one or more hidden memory regions to facilitate the pairing and mutual authentication of the processor 102 and the memory 104, such as described herein.

As described above, the authentication component 106 and the authentication component 108 can be associated with the processor 102 and the memory 104, respectively, to facilitate mutual authentication between the processor 102 and the memory 104. In accordance with one embodiment of the disclosed subject matter, the authentication components 106 and 108 can perform functions to facilitate mutual authentication of an associated memory 104 and processor 102. For example, the authentication component 106 and the authentication component 108 can execute commands and functions to facilitate performance of a mutual authentication algorithm.

According to various embodiments of the disclosed subject matter, a mutual authentication algorithm can comprise executing commands and functions according to a challenge-response protocol between a processor 102 and an associated memory 104. For example, during manufacture of a device (e.g., a device that can comprise software code in a memory 104 and associated with a device processor 102), a procedure can be used to a share a secret between the processor 102 and the associated memory 104 (e.g., a nonvolatile memory such as flash memory), thereby creating a shared secret. Accordingly, during operations of the device with the intended memory contents, such as for example, on power up of the device or within a short time thereafter, the shared secret or information derived therefrom can be mutually verified (e.g., to facilitate mutual authentication) between the processor 102 and the memory 104 for the purpose of ensuring system integrity (e.g., that intended system functions have not been compromised as a result of unauthorized system modifications).

For example, a mutual authentication algorithm can be based in part on the authentication components (e.g., 106 or 108) issuing a challenge (e.g., a message or information) based in part on using a non-repeating random number (e.g., a NONCE). Thus, the message or information represents a challenge from one side to the other (e.g., from the processor 102 to the associated memory 104, or from the associated memory 104 to the processor 102). In return the challenged entity can calculate a response based in part on the shared secret key (e.g., shared between the processor 102 and the associated memory 104) and the challenge.

In accordance with a further aspect of the disclosed subject matter, if the memory 104 contents are replaced with an unauthorized or unintended version (e.g., overwriting a memory 104 or substituting the memory device), the authentication component 106 and/or the authentication component 108 can indicate that the mutual authentication operation fails, which can result in the processor 102 halting execution of further unauthorized functions. Accordingly, pairing a processor 102 and an associated memory 104 can facilitate mutual authentication between a first participant (e.g., one of a processor 102 and an associated memory 104) and a second participant (e.g., the other of a processor 102 and an associated memory 104) to create a secure link 112, according to various aspects of the subject innovation. Thus, by creating a secure link 112 between a memory 104 containing for example, operating system code, and a processor 102 executing the contents (e.g., the operating system code), unauthorized changes can be detected to facilitate causing the processor 102 to halt further execution of unauthorized functions (e.g., unauthorized operating system functions). As a result, such pairing between a memory 104 (e.g. a nonvolatile memory) and a processor 102 can facilitate prevention of unauthorized actions by the processor 102 with respect to protected data to facilitate, for example, enforcing DRM policies, enforcing device manufacturer restrictions, etc.

Figure 2:
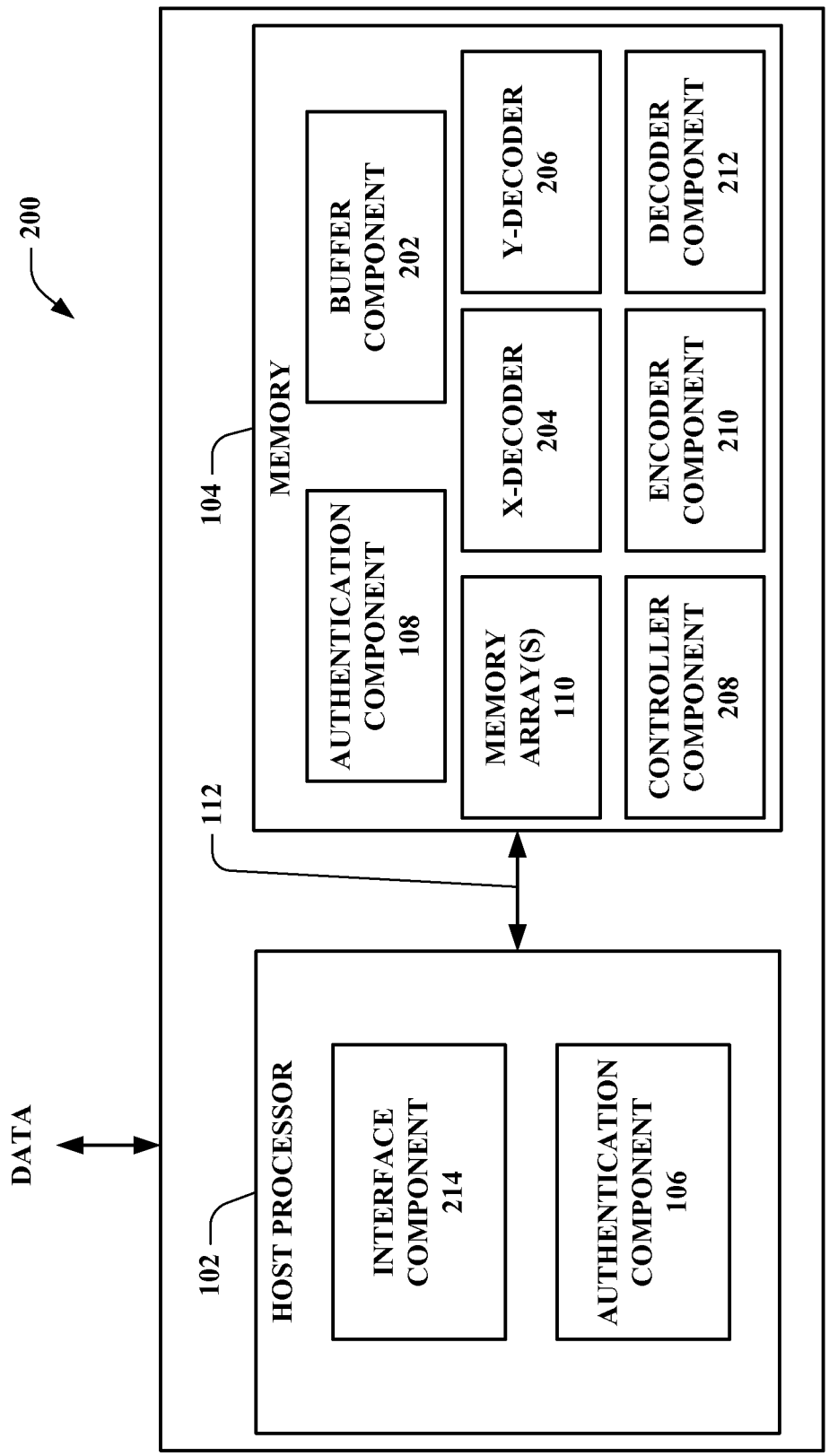
FIG. 2 depicts a block diagram of a system that facilitates processor and memory pairing in accordance with various aspects of the disclosed subject matter.

Referring to FIG. 2, depicted is a block diagram of system 200 that facilitates processor and memory pairing in accordance with various aspects of the disclosed subject matter. System 200 can include a processor 102 (e.g., a host CPU), an associated memory 104 operable to receive and store data, an authentication component 106 associated with the processor 102, an authentication component 108 associated with the memory 104, one or more memory array(s) 110, and a secure link 112 as described above, for example, with respect to system 100.

The memory 104 can further include a buffer component 202, which can comprise one or more of write and/or read (e.g., output) buffers. For example, memory 104 can be operated in a write buffer mode where larger amounts of data can be written to a memory location(s) in the memory 104. The memory 104 can include an X-decoder component 204 and a Y-decoder component 206 that can be associated with the one or more memory array(s) 110 and can each respectively decode inputs/outputs during various operations (e.g., programming, reading, verifying, erasing) that can be performed on the memory cells (not shown), as more fully described herein. For example, the X-decoder component 204 and Y-decoder component 206 can each receive address bus information, which can be provided as part of a command from the processor 102 or a command from a controller component 208 associated with the memory 104, and such information can be utilized to facilitate determining the desired memory location in the memory 104.

The memory 104 can also include an encoder component 210 that can facilitate encoding data being programmed to the memory 104. For example, the encoder component 210 can facilitate converting a digital signal to an analog signal (e.g., current level) to facilitate programming data in the memory locations (e.g., memory cells) in the memory 104. The encoder component 210 can also facilitate generating error correction and detection data (e.g., error correction code (ECC) data) that can be associated with an element of data being programmed into the memory 104 to facilitate error correction of the element of data when error correction is enabled, for example, when the element of data is read from the memory 104.

The memory 104 can further include a decoder component 212 that can facilitate decoding data being read from the memory 104. The decoder component 212 can receive an analog signal associated with data, where the analog signal can be stored in the memory location in the memory 104, and can facilitate converting the analog signal to a digital signal, so that such digital signal representing the read data can be provided to another component (e.g., processor 102, etc.) for further processing. The decoder component 212 can also facilitate error detection and/or correction of the data being read from memory, where the ECC information associated with the data can be employed to facilitate error detection/correction, when error correction is enabled.

Processor 102 can further include interface component 214, which can include and/or provide various adapters, connectors, channels, communication paths, etc. to integrate the memory 104 into virtually any device, operating system, and/or database system(s) and/or with one another system(s). For example, the interface component 214 can provide proprietary or standard interfaces such as Recommended Standard 232 (RS232) serial interface, any of the family of standard Ethernet interfaces, any of the revisions of Universal Serial Bus (USB) interfaces, and/or the like, as well as testing and debugging interfaces, such as Joint Test Action Group (JTAG), and/or the like. In addition, interface component 214 can provide various adapters, connectors, channels, communication paths, etc., that can provide for interaction and/or communication with the processor 102, and/or any other component, data, and the like, associated with the system 200.

Figure 3A:
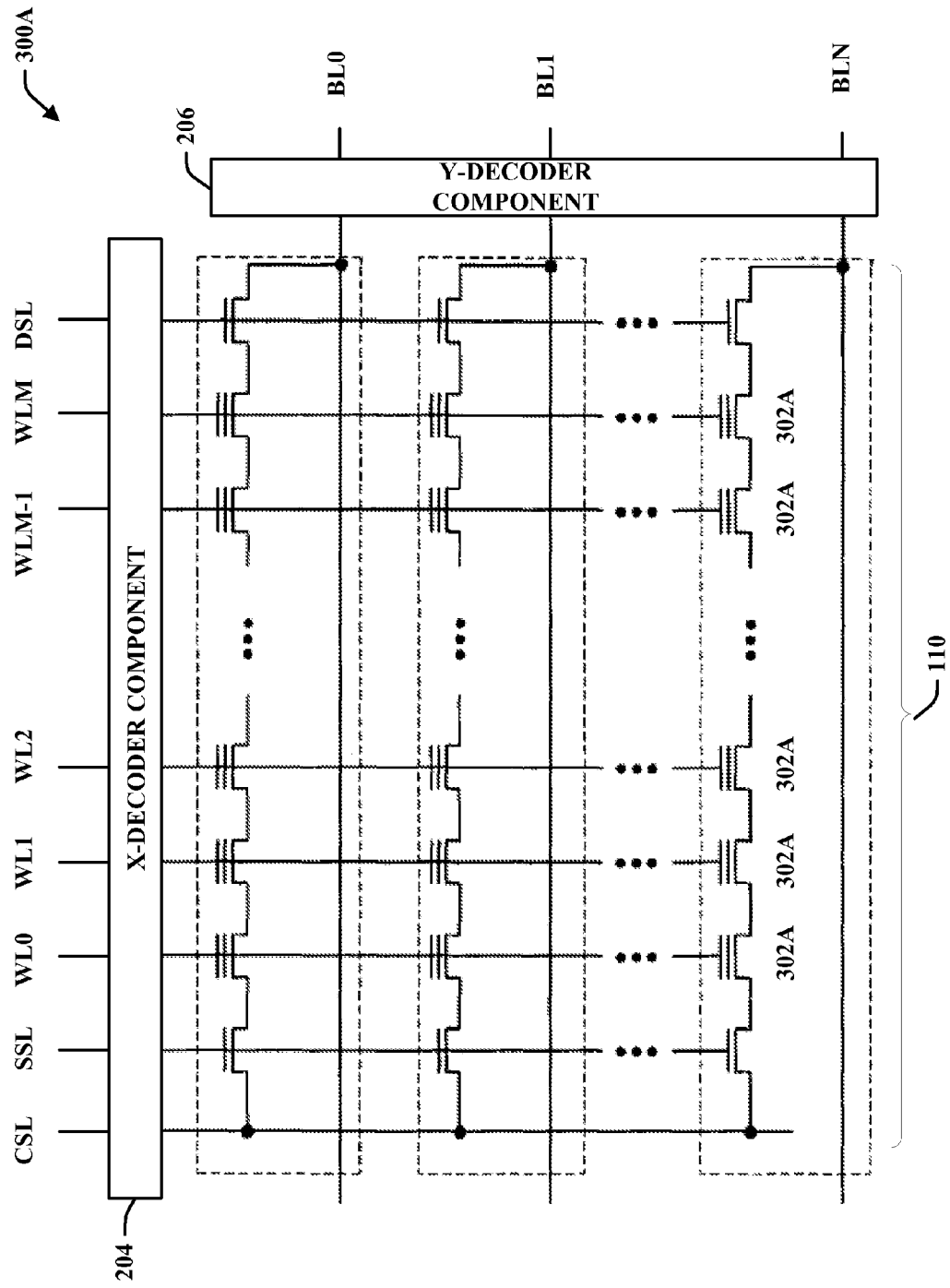
FIG. 3A depicts a block diagram of an exemplary NAND memory array in accordance with the disclosed subject matter.
Figure 3B:
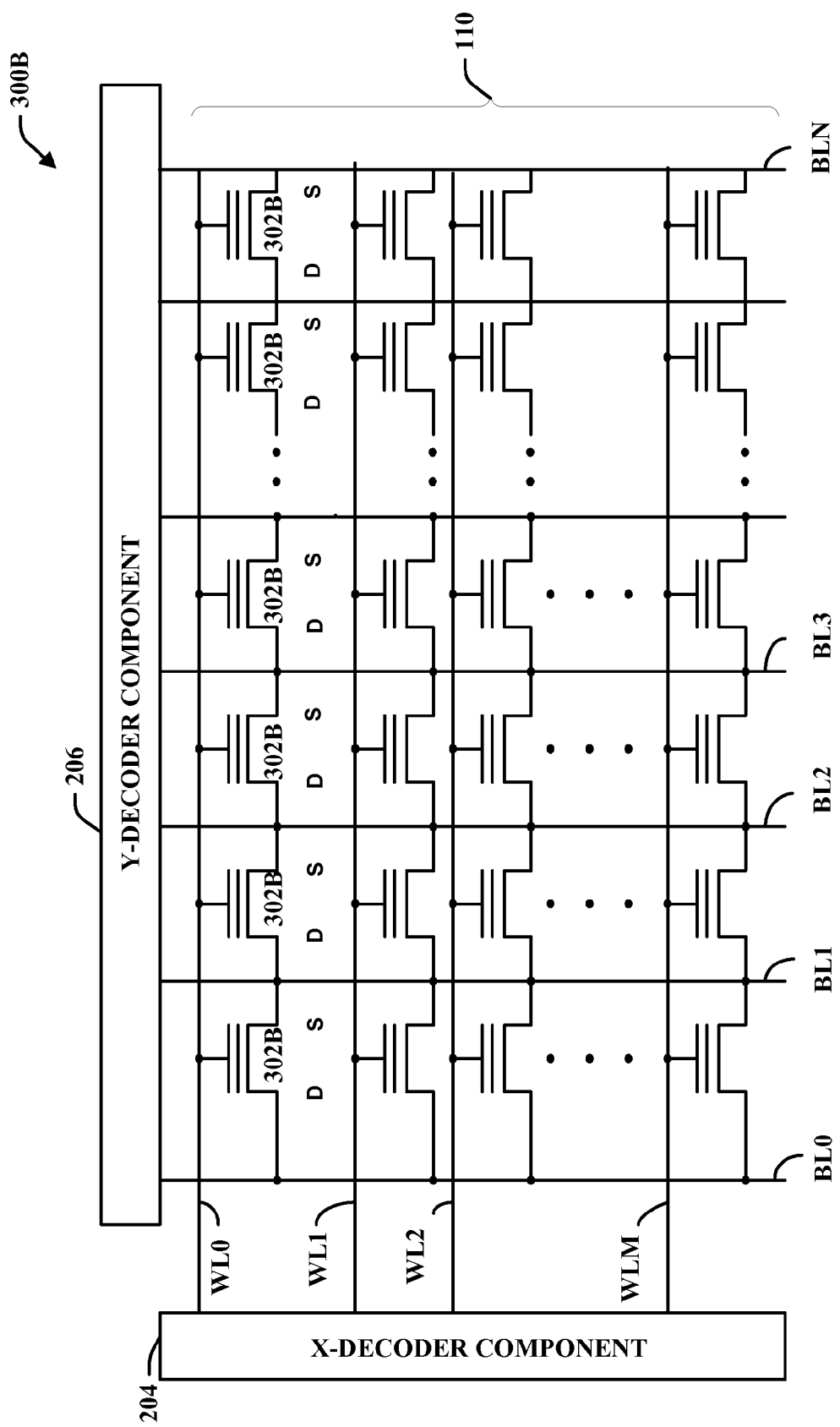
FIG. 3B depicts a block diagram of an exemplary NOR memory array in accordance with the disclosed subject matter.

Turning to FIGS. 3A and 3B, depicted are example diagrams of NAND memory array 300A and NOR memory array 300B, respectively, that can be employed in the one or more memory array(s) 110 of memory 104 in accordance with the disclosed subject matter. The diagrams 300A and 300B (hereinafter also referred to collectively as 300) of the one or more memory array(s) 110 can include a plurality of memory cells 302A or 302B (hereinafter also referred to collectively as "memory cell 302" or "memory cells 302") that each can be comprised of a drain, gate, and source, for example. Each memory cell 302 can have one or more levels therein and can thereby store one or more bits of data therein, where each level can be associated with respective data states of data. The one or more memory array(s) 110 can be included in a memory 104 (not shown in its entirety).

The one or more memory array(s) 110 can be associated with an X-decoder component 204 (e.g., word line (WL) decoder) and a Y-decoder component 206 (e.g., bit line (BL) decoder) that can each respectively decode inputs/outputs during various operations (e.g., programming, reading, verifying, erasing) that can be performed on the memory cells 302. The X-decoder component 204 and Y-decoder component 206 can each receive address bus information from a processor (e.g., processor 102) and/or system controller (not shown) or the like, and can utilize such information to facilitate accessing or selecting the desired memory cell(s) (e.g., memory location(s)) associated with the command. The memory cells 302 can be formed in M rows and N columns. A common WL can be attached to the gate of each memory cell 302 in a row, such as word-lines WL0, WL1, WL2, through WLM. A common BL can be attached to each cell 302B in a column (e.g., in the case of NOR flash) or collectively to cells 302A in the (e.g., in the case of NAND flash), such as bit-lines BL0, BL1, through BLN as depicted in the respective diagrams. A WL can contain, for example, 1024 elements forming multiple words and a sector can include, for example, 512 WLs to provide at least 512k elements of memory, where a memory array of the one or more memory array(s) 110 can comprise a plurality of sectors. In accordance with an aspect of the disclosed subject matter, respective voltages can be applied to one or more cells 302 through the WLs and BLs to facilitate performing operations, such as program, read, erase, and the like.

Figure 4:
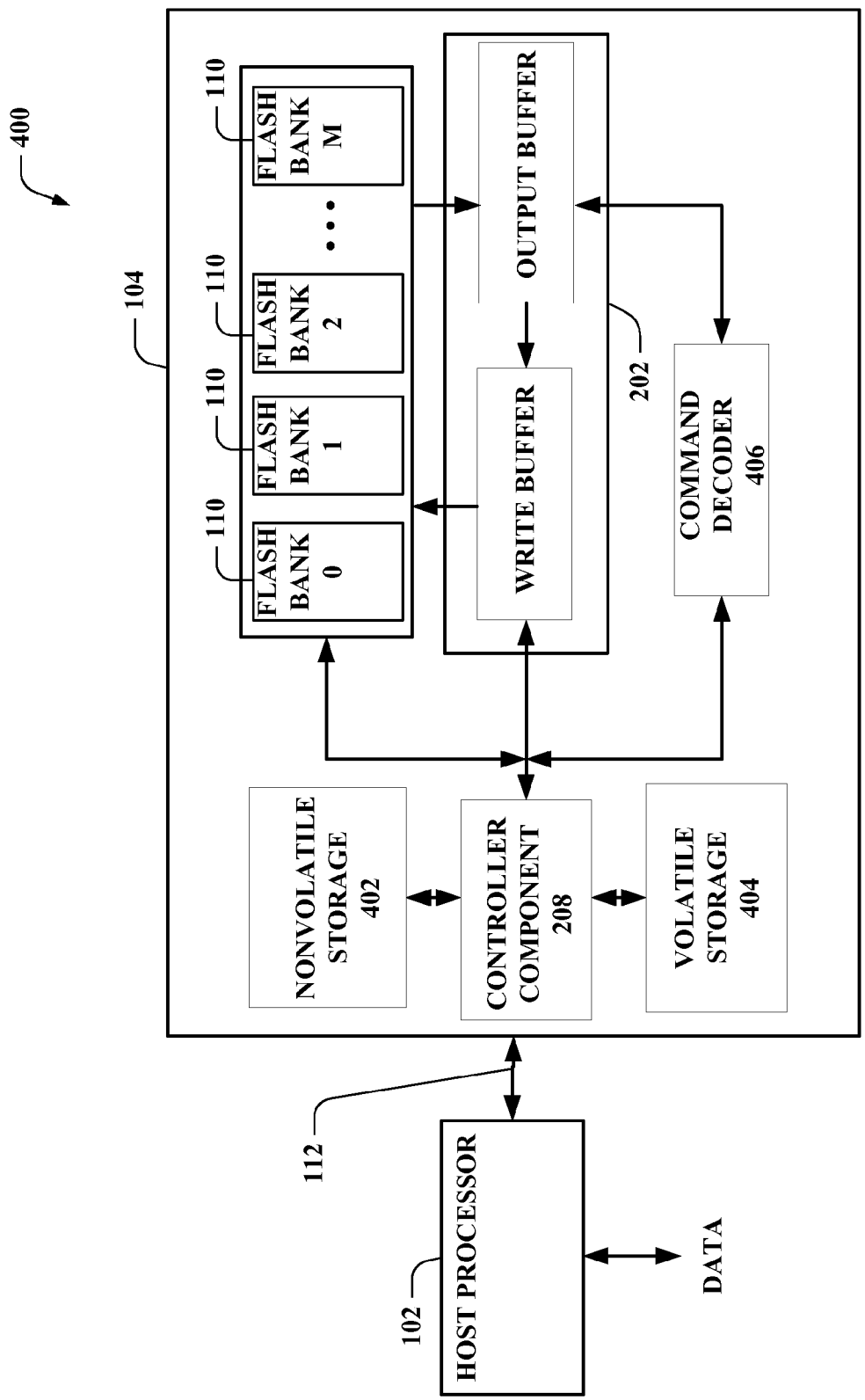
FIG. 4 illustrates a block diagram of a system that facilitates processor and memory pairing in accordance with various aspects of the disclosed subject matter.

Referring to FIG. 4, a block diagram of a system that facilitates processor and memory pairing in accordance with various aspects of the disclosed subject matter is illustrated. System 400 can include a processor 102 that can be associated with a memory 104 (e.g., a nonvolatile memory such as a flash memory) and in communication over a secure link 112. The memory 104 can include one or more memory array(s) 110, in which data can be stored. In addition, system 400 can include buffer component 202. It is to be appreciated that processor 102, memory 104, one or more memory array(s) 110, secure link 112, and buffer component 202 can each include their respective functionality, as more fully described herein, for example, with regard to system 100, system 200, and/or memory arrays 300A and 300B.

In addition memory 104 can be associated with controller component 208 (e.g., a microcontroller unit) to facilitate executing algorithms and associated commands and functions to facilitate the mutual authentication of the processor 102 and the memory 104, such as described herein. For instance, controller component 208 can be a general purpose processor, a special purpose processor, or one or more microprocessor functional unit(s) comprising at least arithmetic and logic elements of a general purpose microprocessor and input/output interfaces. Thus controller component 208 can facilitate storage and retrieval of data and/or instructions to and from an associated nonvolatile storage component 402 (e.g., a read only memory (ROM)) and an associated volatile storage component 404 (e.g., a random access memory (RAM)) such as a static RAM (SRAM)), in accordance with the disclosed subject matter.

The controller component 208 can execute commands, including read, write, and/or erase commands, in order to facilitate reading data from, writing data to, and/or erasing data from the memory 104, where the communication of information between the processor 102 and the memory 104 can be facilitated via a secure link 112 provided by controller component 208 executing algorithms and associated commands and functions to facilitate mutual authentication. To facilitate the features and functions for pairing and mutual authentication as described in further detail herein, for example, with reference to FIGS. 5, 6 and 8, the one or more memory array(s) 110 of the memory 104 can be partitioned into multiple memory regions that can comprise one or more hidden memory regions, according to various embodiments of the disclosed subject matter. For example, certain functionality desired to facilitate the mutual authentication of the processor 102 and the memory 104 and algorithms that facilitate such mutual authentication can be programmed in a hidden sector of memory 104, which can be transferred to volatile storage component 404 at boot up for execution by controller component 208. In an alternative embodiment of the disclosed subject matter, the features can be whole masked into the nonvolatile storage component 402 for execution by controller component 208.

System 400 can also include command decoder component 406 associated with controller component 208 and memory 104. In addition to providing the functionality described above regarding decoder component 212, command decoder component 406 can facilitate activating particular modes of the memory 104 (e.g., according to control commands for controller component 208).

It should be appreciated that controller component 208 can comprise one or more of the following component parts (many of which are not shown unless otherwise indicated) in addition to other features as is known in the art: one or more central processing unit(s) (e.g., from small and simple 4 bit processors to complex 32 bit, 64 bit or more processors, etc.); discrete input and output bits to facilitate control or detection of the logic state of an individual package pin; serial input/output functionality such as, for example, universal asynchronous receiver/transmitter (UART) serial ports, and/or the like; other serial communications interfaces like Inter-Integrated Circuit (I2C), Serial Peripheral Interface (SPI), and/or Controller Area Network (CAN) to facilitate system component interconnectivity; one or more peripherals such as timers, counters, and/or watchdog timers; embedded or associated volatile memory, such as volatile storage component 404, for data storage (e.g., a random access memory, one or more associated cache memory or memories, and/or registers); nonvolatile memory, such as nonvolatile storage component 402, to facilitate program and operating parameter storage (e.g., one or more of ROM, EPROM, EEPROM, and/or Flash memory); one or more associated clock generator(s) (e.g., an oscillator for a quartz timing crystal, resonator, and/or resistive-capacitive (RC) circuit); and/or one or more associated analog-to-digital (A/D) converters and/or digital-to-analog (D/A) converters.

Moreover, controller component 208 can include test and debug functionality such as can be provided via Joint Test Action Group (JTAG) or other test and debug functionality. For example, device testing can be facilitated via a JTAG interface after initial programming of the device. In particular aspects of the disclosed subject matter, the test and debug functionality can be disabled after initial programming to further secure system integrity. Additionally, controller component 208 and associated components can be programmed to perform the desired functions as described herein via a low level language, such as assembly language, and/or via a higher level language, such as American National Standards Institute (ANSI) C, Beginner's All-purpose Symbolic Instruction Code (BASIC), and/or associated variants of ANSI C and BASIC, or other high level programming languages, etc.

It should be further appreciated that one or more of the component parts of system 400 (as well as the other disclosed systems and devices) as described herein can be provided in one or more packages, in part of or all of one die, in multiple dice, or in any combination thereof, and can further be incorporated into part of a larger logic device (e.g., a set top box controller) or part of a larger package providing supplementary or ancillary functions including but not limited to flash devices or other flash memory microcontroller functions, and the like or any combination thereof. For example, in a particular non-limiting embodiment of the disclosed subject matter, the controller component 208 can be provided as part of an embedded microcontroller system including nonvolatile storage component 402 and/or volatile storage component 404, on a separate die from one or more of the memory array(s) 110, and capable of being set either in a separate package or in other die in the same package. Accordingly, in a particular non-limiting embodiment of the disclosed subject matter, memory 104 can embed controller component 208 (e.g., an 8051 MCU clocked at, for example, 40 MHz) with nonvolatile storage component 402 (e.g., an 8KB ROM) and volatile storage component 404 (e.g., a 3KB RAM).

In addition, it should be appreciated that various particular hardware functionality described herein can, in certain circumstances, be implemented in software instructions intended to be executed by a general or special purpose processor. Accordingly, the terms "component," "module," "system," and the like can refer to a computer-related entity, either hardware, firmware, a combination of hardware and software, software, software in execution, firmware, middle ware, microcode, and/or any combination thereof as the context allows.

Figure 5:
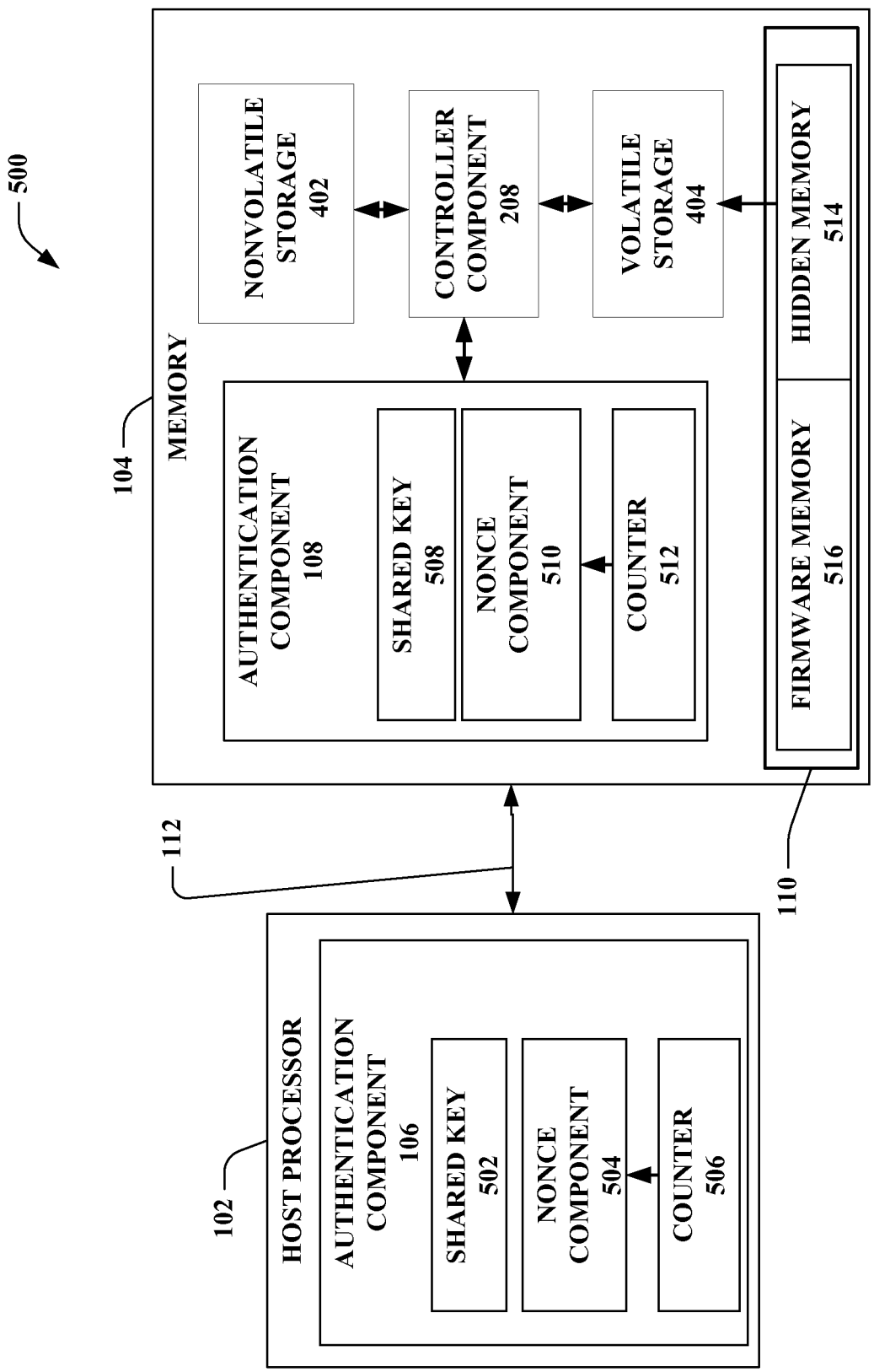
FIG. 5 illustrates a block diagram of an exemplary non-limiting embodiment of a system that facilitates processor and memory pairing in accordance with various aspects of the disclosed subject matter.

According to various aspects of the subject innovation, pairing a processor 102 with a memory 104 can facilitate mutual authentication between the processor and the memory to facilitate memory operations (e.g., read, program, erase, etc.), ensuring memory contents are genuine, and protecting against a malicious host. For example, FIG. 5 illustrates a block diagram of an exemplary non-limiting embodiment of a system 500 that facilitates processor and memory pairing in accordance with various aspects of the disclosed subject matter.

System 500 can include a processor 102 that can be associated with a memory 104 (e.g., a nonvolatile memory such as a flash memory) and in communication over a secure link 112. The memory 104 can include one or more memory array(s) 110, in which data can be stored. In addition, system 500 can include processor authentication component 106 associated with processor 102 and memory authentication component 108, associated memory 104, as well as controller component 208, nonvolatile storage component 402, and nonvolatile storage component 404 as previously described. It is to be appreciated that processor 102, memory 104, authentication components 106 and 108, one or more memory array(s) 110, secure link 112, as well as controller component 208, nonvolatile storage component 402, and volatile storage component 404 can each include their respective functionality, as more fully described herein, for example, with regard to system 100, system 200, memory arrays 300A and 300B, and/or system 400.

Accordingly, an authentication protocol as described herein enables one or more memory operations at each power up of the processor 102 memory 104 pair. As a result of pairing the processor 102 with the memory 104, the authentication of the processor 102 by the memory 104 can protect against a malicious host, while the authentication of the memory 104 by the processor 102 can ensure the memory contents are genuine.

According to various non-limiting embodiments of the disclosed subject matter, the authentication component 106 associated with processor 102 of system 500 can include a shared key component 502 to facilitate receiving, storing, and/or comparing a shared secret (e.g., a shared key), a nonce component 504 to facilitate generating a nonce which can be used as a challenge, and a counter 506 to facilitate generating a nonce. In addition, the authentication component 108 associated with memory 104 of system 500 can similarly include a shared key component 508, a nonce component 510, and a counter 512. Moreover, the one or more memory array(s) 110 of system 500, or portions thereof, can be partitioned into at least a hidden memory region 514, according to various embodiments of the disclosed subject matter. For example, certain features (e.g., data or instructions) for facilitating the disclosed functions and algorithms can be programmed in a hidden memory region 514 of memory 104, which can be made accessible only to controller component 208, and which can be transferred to nonvolatile storage component 402 at boot up for execution or processing by controller component 208. At or substantially near the first instant of power up, mutual authentication can be performed to create a root level of trust prior to execution of higher level system functions. Additionally, hidden memory region 514 can facilitate storage of data and/or instructions (e.g., firmware memory contents authentication and/or decryption keys), controller component 208 control commands, etc.) to facilitate authentication or verification of information stored in memory 104 (e.g., processor 102 firmware), or portions thereof, and related functions.

Accordingly, the one or more memory array(s) 110 of system 500, or portions thereof, can be further partitioned into a firmware memory region 516, according to various embodiments of the disclosed subject matter. Additionally, according to an aspect of the disclosed subject matter, firmware for the processor 102 can be stored in the memory 104 (e.g., firmware memory 516 region), or portions thereof, and can be encrypted with a different key for each device incorporating a processor 102 and associated memory 104, thereby further securing a population of protected devices against unauthorized modification. As a result, encrypted firmware contents can be decrypted and/or authenticated as desired at each boot up (e.g., by the processor 102 and/or controller component 208, or a combination thereof), for example, and after mutual authentication between processor 102 and memory 104 has successfully completed.

According to various non-limiting embodiments of the disclosed subject matter, authentication components 106 and 108 can include or be associated with respective shared key components 502 and 508. For example, during manufacture of a device (e.g., a device that can comprise software code in a memory and associated with a device processor), a procedure can be used to a share a secret between a processor associated with the device and the memory (e.g., a nonvolatile memory such as flash memory), thereby creating a shared secret.

In addition, authentication components 106 and 108 can include or be associated with respective nonce components 504 and 510. Nonce components 504 and 510 can facilitate issuing and storing a nonce for the purpose of mutual authentication. A nonce can be, for example, a number or bit string that is intended to be used only once. In the alternative, a nonce can be a parameter intended to be reused so infrequently that attempts to guess or predict future nonce usage is practically impossible. For example, a nonce can be a random or pseudo-random number issued in an authentication protocol to ensure that old communications between the processor 102 and the memory 104 cannot be reused in replay attacks.

As a result, nonce components 504 and 510 can ensure that the nonce is different each time, or substantially so as to ensure that guessing or predicting future nonce usage is practically impossible. As a result, a nonce that can be presented as a challenge from a first participant to a second participant, can be a challenge that is relatively unique each time a challenge is issued. To ensure that a nonce is used only once, or so substantially infrequent, it should be time-variant (e.g., including a suitably granular timestamp in its value), or generated with enough random bits to ensure a probabilistically insignificant chance of repeating a previously generated value. Accordingly, nonce components 504 and 510 can include or be associated with respective counter components 506 and 512 to facilitate generating a nonce.

In addition, authentication components 106 and 108 can include or be associated with cryptographic components (not shown) to facilitate various aspects of the disclosed subject matter. For example, the authentication components 106 and 108 can be associated with cryptographic components (not shown) that can facilitate encrypting and/or decrypting data to facilitate, for example, computing a challenge-response, decrypting or verifying firmware contents (e.g., via cryptographic hash functions, message authentication codes (MACs), digital signatures or otherwise), securing data being written to, stored in, and/or read from the memory 104.

In accordance with an aspect of the disclosed subject matter, cryptographic components (not shown) associated with authentication components 106 and 108 can provide symmetric cryptographic tools and accelerators (e.g., Twofish, Blowfish, AES, TDES, IDEA, CAST5, RC4, etc.) to facilitate data security and/or securing the memory 104. In addition, cryptographic components (not shown) can also provide asymmetric cryptographic accelerators and tools (e.g., RSA, Digital Signature Standard (DSS), and the like) to facilitate data security and/or securing the memory 104. Additionally, cryptographic components (not shown) can provide accelerators and tools (e.g., Secure Hash Algorithm (SHA) and its variants such as, for example, SHA-0, SHA-1, SHA-224, SHA-256, SHA-384, and SHA-512) to facilitate data security and/or securing the memory 104 (e.g., the mutual authentication of the processor 102 and memory 104).

To illustrate the authentication protocol according to various aspects of the subject innovation, nonce components 504 and 510 can generate a nonce intended to be sent as a challenge, for example, between a first participant (e.g., one of a processor 102 and an associated memory 104) and a second participant (e.g., the other of a processor 102 and an associated memory 104). In response, the second participant can create a challenge-response based in part on the received nonce and the shared secret (e.g., encrypting the nonce via the shared key and an encryption algorithm). Upon receiving the challenge-response from the second participant, the first participant can decrypt the challenge-response (e.g., via the shared key and a corresponding decryption algorithm). If the first participant can successfully decrypt the challenge-response to determine that the response message received was based on the nonce that was initially sent to the second participant, then the first participant can verify that the second participant is in possession of the shared secret, and thus can infer that the second participant is the intended participant (e.g., a flash memory 104), thereby authenticating the second participant. Once the second participant has authenticated the first participant in a similar manner, thereby mutually authenticating a processor 102 and a memory 104, a secure link 112 or root trust is provided, thus facilitating memory operations (e.g., one or more of operations read, program, erase, etc.) prior to or concurrently with ensuring memory 104 contents are genuine (e.g., authentication or verification of processor firmware stored in memory 104, or portions thereof), and/or decrypting encrypted processor firmware stored in memory 104, or portions thereof.

Accordingly, during operations of the device with the intended memory contents, such as for example, on power up of the device or within a short time thereafter, the shared secret or information derived therefrom can be mutually verified (e.g., to facilitate mutual authentication) between the processor and the memory for the purpose of ensuring system integrity (e.g., that intended system functions have not been compromised as a result of unauthorized system modifications such as memory module replacement, etc.). In accordance with a further aspect of the disclosed subject matter, the mutual authentication fails, for example, if the memory contents are replaced with an unauthorized or unintended version (e.g., overwriting a memory or substituting the memory device) or if a malicious host attempts to circumvent the mutual authentication procedure, the failure of which can result in the processor 102 halting execution of further unauthorized functions.

While various embodiments, components, and functionality are illustrated in particular numbers or configurations in the context of the description of system 500 (as well as in the context of other systems described herein), one having ordinary skill in the art would recognize that various modifications could be made without departing from the spirit of the disclosed subject innovation. In addition, it should be understood that while various components and functionality are illustrated as discrete blocks either in combination with or separate from other components and functionality, one having ordinary skill in the art would recognize that various levels of integration or separation of components and functionality may be accomplished according to known techniques and system design considerations. Thus, it should be understood that the descriptions herein are but a few of many embodiments that may be possible while keeping within the scope of the claims appended hereto.

Figure 6:
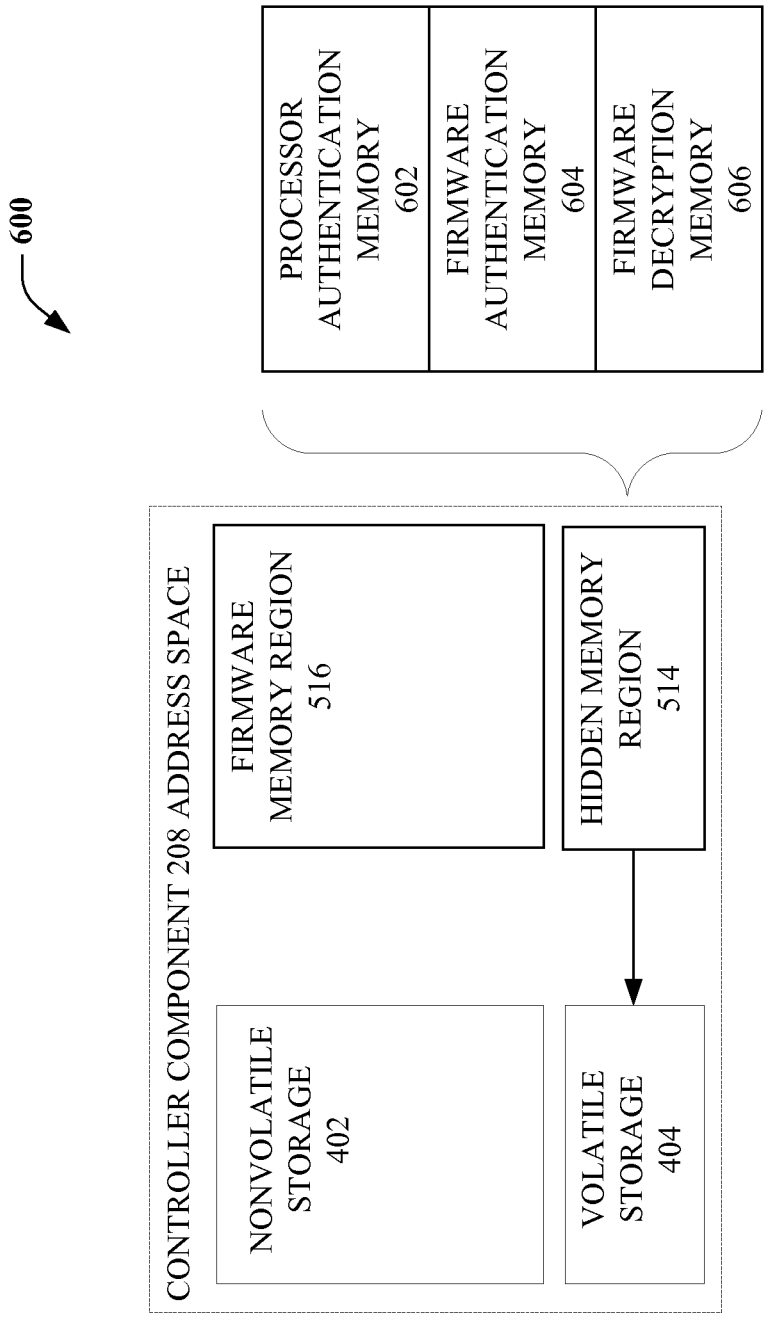
FIG. 6 illustrates an exemplary non-limiting block diagram of a memory space in accordance with various aspects of the subject innovation.

FIG. 6 illustrates an exemplary non-limiting block diagram of a address space 600 associated with the controller component in accordance with various aspects of the subject innovation. Accordingly, address space 600 can comprise address space associated with nonvolatile storage component 402, volatile storage component 404, hidden memory region 514, and firmware memory region 516. It is to be appreciated that nonvolatile storage component 402, volatile storage component 404, hidden memory region 514, and firmware memory region 516 can each include their respective functionality, as more fully described herein, for example, with regard to system 400, system 500, and memory arrays 300A and 300B.

In addition, according to a particular aspect of the disclosed subject matter, controller component address space 600 can comprise stored encryption software functionality (e.g., AES encryption software), for example, in nonvolatile storage component 402 or portions thereof.

As described, memory 104 can be divided into a plurality of portions to facilitate pairing a processor 102 and memory 104. For example, in a particular aspect of the disclosed subject matter, memory 104 can be divided in two portions (e.g., a hidden memory region 514 and firmware memory region 516). Accordingly, hidden memory region 514 can be made accessible only to the controller component 208 associated with memory 104. In addition, firmware memory region 516 can additionally be made accessible (e.g., read operation enabled) to processes external to the controller component 208 associated with memory 104 (e.g., made accessible to processor 102), for example, after the mutual authentication between the processor 102 and the processor 104 has been successfully completed.

According to various aspects of the disclosed subject matter, data and/or instructions (e.g., shared keys, control commands, etc.) to be stored in the hidden memory region 514 can be programmed and locked at a manufacturing stage (e.g., at a manufacturing stage of a device comprising processor 102 and memory 104 as described herein). For example, the control commands for controller component 208 of a suitable memory 104, as well as shared keys, other parameters, and/or keys for decrypting and/or verifying the encrypted processor 102 firmware (e.g., encrypted firmware stored in firmware memory region 516) can be programmed to facilitate the mutual authentication.

Accordingly, hidden memory region 514 can facilitate hiding a plurality of keys, shared or otherwise. For example, in a particular aspect of the disclosed subject matter, three kinds of keys can be hidden in the hidden memory region 514 (e.g., one key to facilitate authentication of the processor 102 by the memory 104, another key to facilitate authentication of memory 104 or contents thereof by a processor 102, and another key to facilitate the verifying the authenticity of the firmware stored, for example, in firmware memory region 516).

Thus, hidden memory region 514 of address space 600 can comprise processor authentication memory 602 (e.g., to facilitate authentication of the processor 102 by the memory 104), firmware authentication memory 604 (e.g., to facilitate authentication of memory 104 or contents thereof by a processor 102), and firmware decryption memory 606 to facilitate the verifying the authenticity of the contents of firmware memory region 516, according to an aspect of the disclosed subject matter. As a result, the stored data and/or instructions in hidden memory region 514 can be loaded from the hidden memory region 514 into nonvolatile storage component 404 for execution and/or processing by controller component 208 to facilitate mutual authentication.

The following section provides additional details regarding particular non-limiting embodiments of the disclosed subject matter for the purpose of illustration and not limitation. Thus, it is to be appreciated that the following description is but one of many embodiments that may be possible while keeping within the scope of the claims appended hereto.

Figure 7:
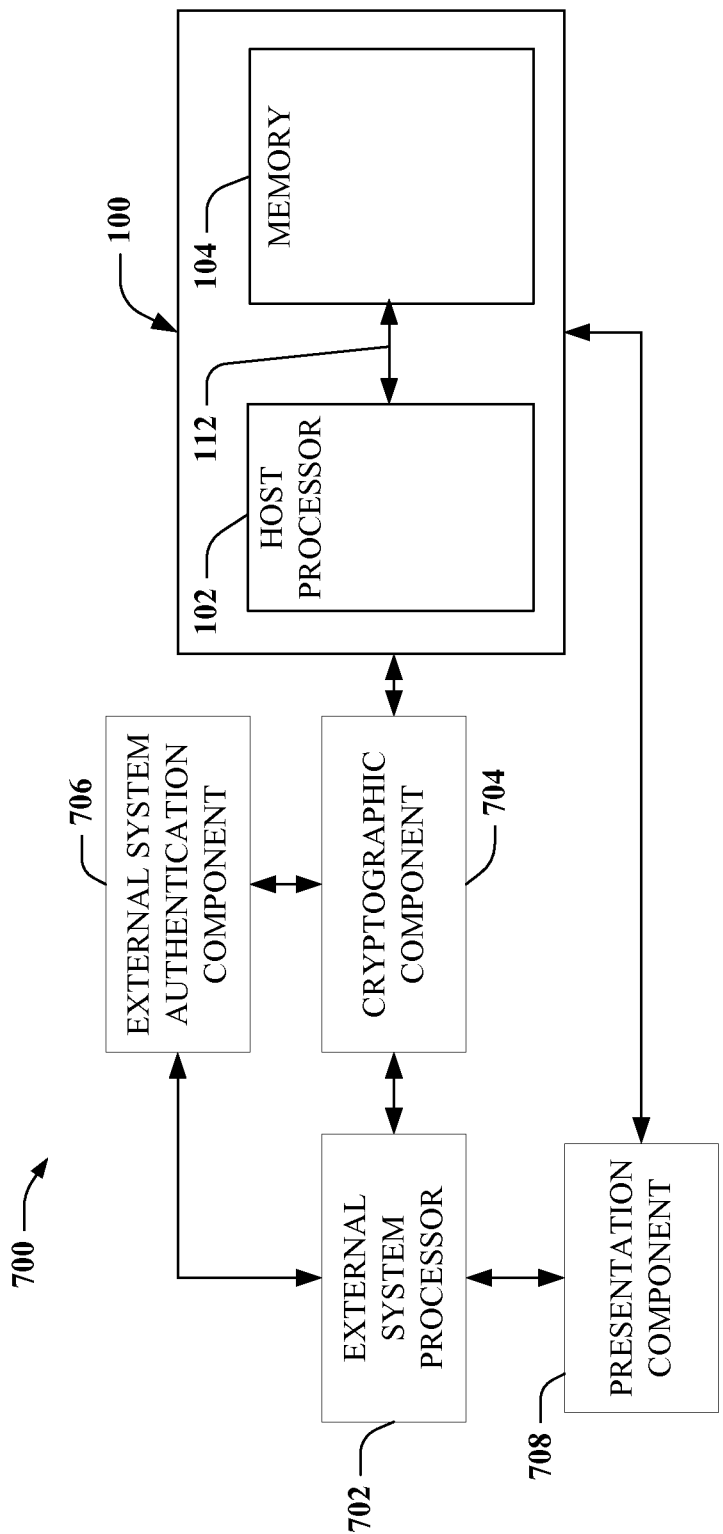
FIG. 7 depicts an exemplary high-level block diagram of a system suitable for incorporation of various aspects of the disclosed subject matter.

Referring to FIG. 7, an exemplary high-level block diagram of a system 700 suitable for incorporation of various aspects of the disclosed subject matter is illustrated. System 700 can include a processor 102 that can be associated with a memory 104, which can be a flash memory, for example, in communication over a secure link 112 as described with respect to system 100 and thereafter. It is to be appreciated that processor 102, memory 104, and secure link 112, can each include their respective functionality and or subcomponents or portions thereof, as more fully described herein, for example, with regard to systems 100, 200, 400, 500, and/or memory arrays 300A and 300B, and address space 600. In addition, system 700 can include an external system processor 702.

The external system processor 702 can be associated with a cryptographic component 704 that can facilitate encrypting and/or decrypting data to facilitate securing data being written to, stored in, and/or read from the memory 104. For example, system 100 of FIG. 7 can function as a portion of a larger device (e.g., a set top box) in conjunction with the additional components of system 700. Accordingly, external system processor 702 can be a separate coprocessor to processor 102, for example, which can facilitate, receiving and processing encrypted programming information. Alternatively, external system processor 702 functionality, as well as the additional functionality described with respect to the components of system 700, can be an additional subset of the functionality provided by processor 102. For example, after processor 102 successfully completes its mutual authentication with associated memory 104, the additionally functionality described herein, or portions thereof, can be "unlocked" and provided by processor 102 continuing to execute this subset of higher level functionality.

In accordance with an aspect of the disclosed subject matter, cryptographic component 704 can provide symmetric cryptographic tools and accelerators (e.g., Twofish, Blowfish, AES, TDES, IDEA, CAST5, RC4, etc.) to facilitate data security and/or securing the memory 104 (e.g., the mutual authentication of the processor 102 and memory 104). Cryptographic component 704 can also provide asymmetric cryptographic accelerators and tools (e.g., RSA, Digital Signature Standard (DSS), and the like) to facilitate data security and/or securing the memory 104. Additionally, cryptographic component 704 can provide accelerators and tools (e.g., Secure Hash Algorithm (SHA) and its variants such as, for example, SHA-0, SHA-1, SHA-224, SHA-256, SHA-384, and SHA-512) to facilitate data security and/or securing the memory.

System 700 can further include an external system authentication component 706 that can solicit authentication data from an entity, and, upon receiving the proper authentication data so solicited, can be employed, individually and/or in conjunction with information acquired and ascertained as a result of biometric modalities employed, to facilitate control access to the memory 104. Returning to the set top box example, authentication can be facilitated between a set top box and the home office or content provider, for example, to obtain authorized firmware updates, desired pay programming, etc. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 704. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities. As described above, the functionality provided by external system authentication component 706 can be a subset of higher level functionally provided by processor 102 after successful mutual authentication has occurred.

The external system authentication component 706 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity. In accordance with one embodiment of the disclosed subject matter, the processor 102, the memory 104, the cryptographic component 704, and the external system authentication component 706 can be situated or implemented on a single integrated-circuit chip. In accordance with another embodiment, the processor 102, the memory 104, the cryptographic component 704, and the authentication component 704 can be implemented on an application-specific integrated-circuit (ASIC) chip.

Referring again to FIG. 7, system 700 can also include a presentation component 708, which can be associated with the external system processor 702. As described above, the functionality provided by presentation component 708 can be a subset of higher level functionality provided by processor 102 after successful mutual authentication has occurred. The presentation component 708 can provide various types of user interfaces to facilitate interaction between a user and any component coupled to the external system processor 702. Returning to the set top box example, presentation component 708 can facilitate presenting information related to available programming to a user and receiving selection or order information from the user, for example. As depicted, the presentation component 708 is a separate entity that can be utilized with the external system processor 702 and associated components. However, it is to be appreciated that the presentation component 708 and/or similar viewing components can be incorporated into the external system processor 702, processor 102, and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present such results. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the external system processor 702, processor 102, and/or a stand-alone unit.

The user can also interact with the regions to select and provide information via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Systems 100, 200, 400, and 500 and/or system 700 or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g., video game), a digital camera, an electronic organizer, an audio player and/or recorder, an electronic device associated with digital rights management, Personal Computer Memory Card International Association (PCMCIA) cards, trusted platform modules (TPMs), an electronic control unit (ECU) associated with a motor vehicle (e.g., ECU associated with fuel injection system), a global positioning satellite (GPS) unit, an electronic device associated with airplanes, an electronic device associated with industrial control systems, Hardware Security Modules (HSMs), a set-top box, a secure memory device with computational capabilities, a device with a tamper-resistant chip(s), and the like.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

Figure 8:
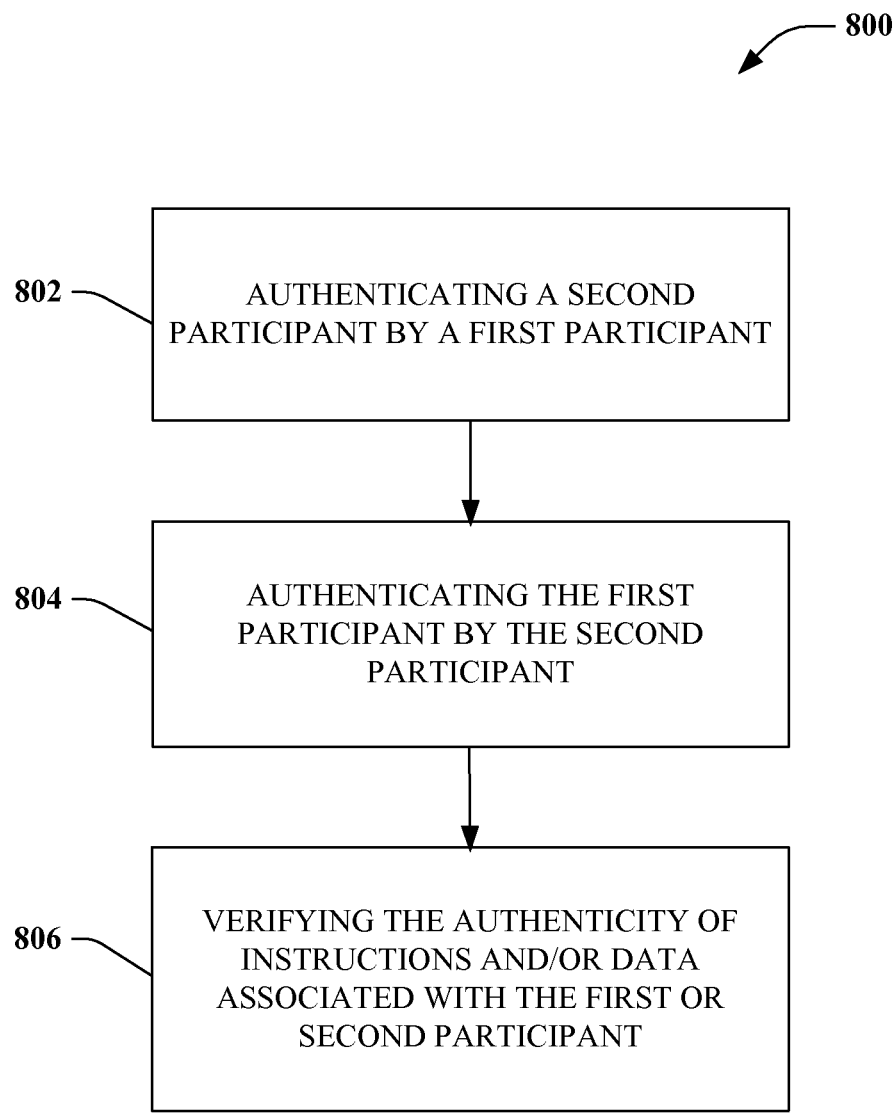
FIG. 8 depicts an exemplary high-level methodology that facilitates mutual authentication of participants in a system for processor to memory pairing in accordance with various aspects of the subject innovation.
Figure 9:
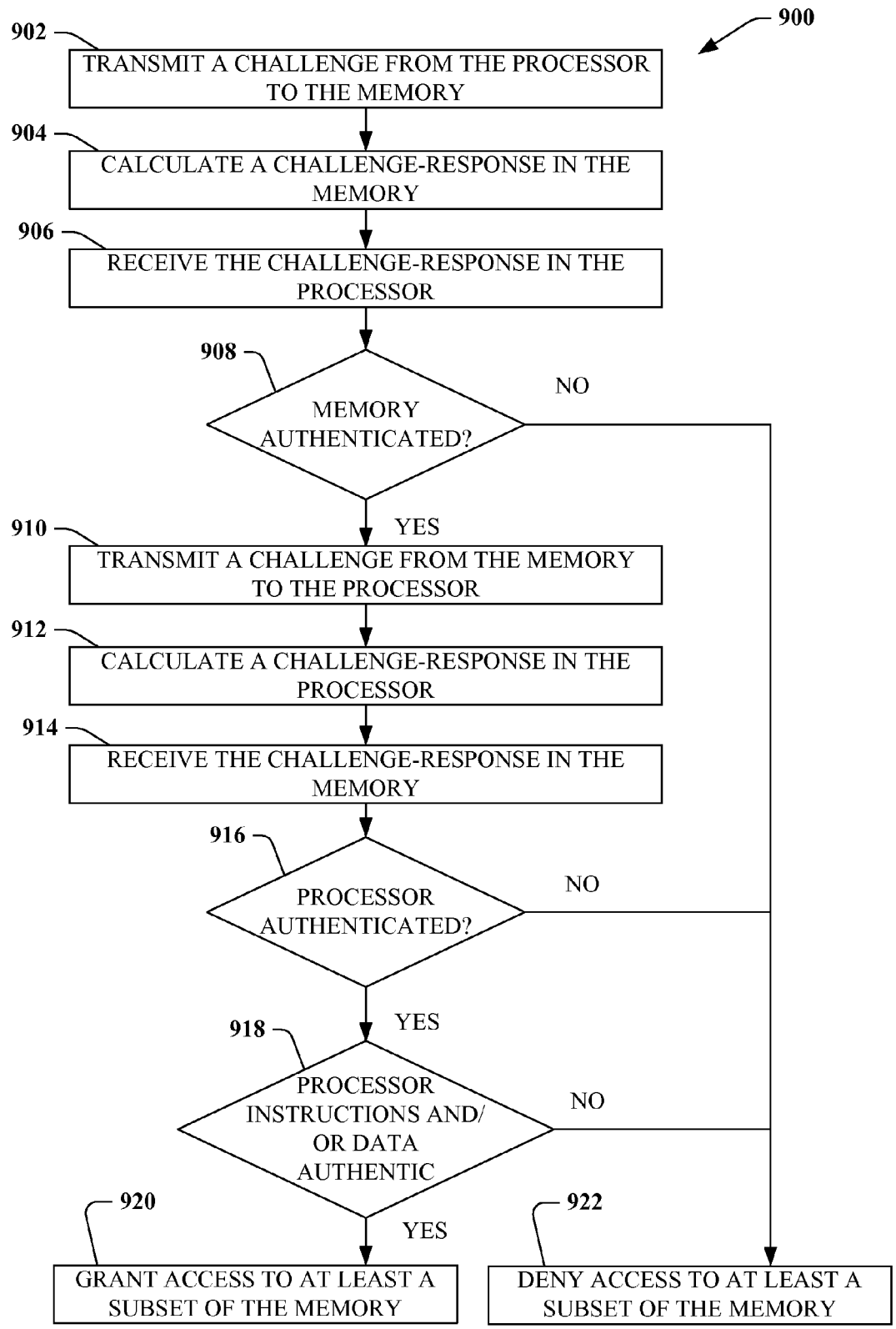
FIG. 9 depicts an exemplary high-level methodology that facilitates pairing a processor and a memory to facilitate mutual authentication in accordance with various aspects of the disclosed subject matter.

In view of the exemplary systems described supra, methodologies that can be implemented in accordance with the disclosed subject matter will be better appreciated with reference to the flowchart of FIGS. 8 and 9. While for purposes of simplicity of explanation, the methodology is shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

FIG. 8 depicts an exemplary high-level methodology 800 that facilitates mutual authentication of participants in a system for processor to memory pairing in accordance with various aspects of the disclosed subject matter. At 802, a second participant can be authenticated by a first participant. For instance, a challenge can be transmitted by a first participant to a second participant to facilitate calculating a challenge-response by the second participant. The challenge-response can be calculated based in part on the challenge and a shared secret, where the shared secret is shared at least between the first and second participants. In addition, the challenge-response can be received by the first participant to facilitate authentication of the second participant.

For instance, in the case where the first participant includes one or more processors (e.g., processor 102), and the second participant includes one or more memories (e.g., memories 104), each can comprise an authentication component (e.g., authentication component 106 or 108), according to various aspects of the subject innovation. In turn, authentication component 106 or 108 can comprise nonce components 504 and 510 that can facilitate generating and/or transmitting a nonce as a challenge, for example, between the one or more processors 102 and an associated one or more memories 104. In response, the one or more memories 104, which can be associated with controller component 208, can facilitate calculating a challenge-response (e.g., encrypting the nonce via a shared key and an encryption algorithm) based in part on the received nonce and the shared key (e.g., a shared secret stored in hidden memory region 514) for transmission back to the one or more processors 102. Upon receiving the challenge-response from the one or more memories 104, the one or more processors 102 can facilitate decrypting the challenge-response (e.g., via the shared key and a corresponding decryption algorithm).

If the processor(s) 102 can successfully decrypt the challenge-response to determine that the message received was based on the nonce that was initially sent to the one or more memories 104, the processor(s) 102 can verify that the memory(ies) 104 is/are in possession of the shared secret. Thus, the processor(s) 102 can infer that the memory(ies) 104 is/are the intended system participant(s) (e.g., that the memory(ies) 104 is/are intended or authorized participant(s) in the system), thereby authenticating the second participant (e.g., the memory(ies) 104).

At 804, a first participant can be authenticated by the second participant. Continuing with the above example for instance, the authentication component 106 or 108 each can comprise respective nonce components 504 and 510 that can facilitate generating and/or transmitting a nonce as a challenge, for example, between the memory(ies) 104 and the associated processor(s) 102. For example, the memory(ies) 104, which can be associated with controller component 208, can facilitate transmitting the nonce as a challenge to the processor(s) 102. Upon receiving the challenge from the memory(ies) 104, the processor(s) 102 can facilitate calculating a challenge-response (e.g., encrypting the nonce via a shared key and an encryption algorithm) based in part on the received nonce and the shared key (e.g., a shared secret stored in hidden memory region 514) for transmission back to the memory(ies) 104. Upon receiving the challenge-response from the processor(s) 102, the memory(ies) 104, which can be associated with controller component 208, can facilitate decrypting the challenge-response (e.g., via the shared key and a corresponding decryption algorithm).

If the memory(ies) 104 can successfully decrypt the challenge-response to determine that the message received was based on the nonce that was initially sent to the processor(s) 102, then the memory(ies) 104 can verify that the processor(s) 102 is/are in possession of the shared secret. Thus, the memory(ies) 104 can infer that the processor(s) 102 is/are the intended system participant(s) (e.g., that the processor(s) 102 is/are intended or authorized participant(s) in the system), thereby authenticating the first participant (e.g., the processor(s) 102).

Once the first and second participants have mutually authenticated the other (e.g. mutually authenticating a processor 102 and a memory 104), a secure link 112 or root trust can be provided between the first and second participant.

At 806, the authenticity of instructions and/or data associated with the first or second participant can be verified. Continuing with the above example, for instance, the authenticity of a set of one or more of instructions or data (e.g., instructions and/or data associated with processor 102 and/or controller component 208, firmware, or a combination thereof) associated with the processor(s) 102 can be verified. For example, in one aspect of the disclosed subject matter, firmware, or portions thereof, for the processor(s) 102 can be stored in the memory(ies) 104, for example, in an accessible memory portion (e.g., firmware memory region 516) of the memory(ies) 104.

In another aspect of the disclosed subject matter, data and/or parameters, or portions thereof, for the processor(s) 102 can be stored in the memory(ies) 104, for example, in an accessible memory portion (e.g., firmware memory region 516) of the memory(ies) 104. In a further aspect of the disclosed subject matter, firmware, data, and/or parameters, or portions thereof, for controller component 208 can be stored in the memory(ies) 104. In yet another aspect of the disclosed subject matter, the contents stored in the accessible memory portion (e.g., firmware memory region 516) of the memory(ies) 104 can be, for example, encrypted or otherwise obscured and/or protected. Thus, the memory(ies) 104, which can be associated with controller component 208, can facilitate accessing firmware memory region 516 and hidden memory region 514 to facilitate decrypting and/or verifying the authenticity of (e.g., via encryption and/or authentication information stored in hidden memory region 514) the contents of firmware memory region 516.

As a result, based in part on the outcome of the mutual authentication between the first and second participants of the system and the verification of the contents of firmware memory region 516, access to at least a subset of the memory(ies) 104 can be granted. Thus, the methodology 800 can facilitate securing memory operations (e.g., one or more of operations read, program, erase, etc.), ensuring memory 104 contents are genuine (e.g., authentication or verification of processor firmware stored in memory 104, or portions thereof), and decrypting encrypted processor firmware that can be stored in memory 104, or portions thereof. In addition, according to further aspects of the disclosed subject matter, contents of firmware memory region 516 can be encrypted with a different key for each device incorporating a processor 102 and associated memory 104. As a result, the firmware can be decrypted as desired (e.g., by the processor 102, controller component 208, or any combination thereof) at each boot up, for example, while providing increased system integrity for a population of devices.

Accordingly, during operations of a device with the intended memory contents (e.g., an intended memory 104 capable of mutual authentication with a processor 102 and comprising verified authentic contents of firmware memory region 516), such as for example, on power up of the device or within a short time thereafter, the participants can be mutually authenticated and the contents of firmware memory region 516 verified to ensure system integrity (e.g., that intended system functions have not been compromised as a result of unauthorized system modifications such as memory module replacement etc.). In accordance with a further aspect of the disclosed subject matter, if the mutual authentication fails, for example, if the memory contents are replaced with an unauthorized or unintended version (e.g., overwriting a memory or substituting the memory device), or if a malicious host attempts to circumvent the mutual authentication procedure, the mutual authentication can fail and result in the processor 102 halting execution of further unauthorized functions.

FIG. 9 depicts an exemplary high-level methodology 900 that facilitates pairing a processor and a memory to facilitate mutual authentication in accordance with various aspects of the disclosed subject matter. For instance, in one aspect of methodology 900, a memory can be authenticated by a processor.

For example, at 902, a challenge can be transmitted from the processor 102 to a memory 104. For instance, each of the processor 102 and the memory 104 can comprise an authentication component (e.g., authentication component 106 or 108), according to various aspects of the subject innovation. In turn, authentication component 106 or 108 can comprise nonce components 504 and 510 that can facilitate generating and/or transmitting a nonce as a challenge.

At 904, a challenge-response can be calculated in the memory 104. For instance, memory 104 can calculate the challenge-response based in part on the challenge (e.g., a transmitted nonce) and a secret shared between the processor 102 and the memory 104 (e.g., a shared secret key). For example, memory 104 can be associated with controller component 208, which can facilitate calculating a challenge-response (e.g., encrypting the nonce via a shared key and an encryption algorithm) based in part on the received nonce and the shared key (e.g., a shared secret stored in hidden memory region 514) for transmission back to the processor 102.

At 906, the challenge-response can be received by the processor 102 to facilitate authentication of the memory 104. At 908, a determination can be made regarding whether the memory 104 can be authenticated. For example, upon receiving the challenge-response from memory 104, the processor 102 can facilitate decrypting the challenge-response (e.g., via the shared key and a corresponding decryption algorithm). For example, if the processor 102 can successfully decrypt the challenge-response to determine that the message received was based on the nonce that was initially sent to the memory 104, the processor 102 can verify that the memory 104 is in possession of the shared secret. Thus, the processor 102 can determine and/or infer that the memory 104 is intended or authorized, thereby authenticating the memory 104.

If it is determined that the memory 104 is authentic, methodology 900 can proceed to authenticate the processor. For example, at 910, a challenge can be transmitted from the memory 104 to a processor 102. As described, each of the processor 102 and the memory 104 can comprise an authentication component (e.g., authentication component 106 or 108), according to various aspects of the subject innovation. In turn, authentication component 106 or 108 can comprise nonce components 504 and 510 that can facilitate generating and/or transmitting a nonce as a challenge.

At 912, a challenge-response can be calculated in the processor 102. For instance, processor 102 can facilitate calculating the challenge-response based in part on the challenge (e.g., a transmitted nonce) and a secret shared between the processor 102 and the memory 104 (e.g., a shared secret key). For example, processor 102 can facilitate calculating a challenge-response (e.g., encrypting the nonce via a shared key and an encryption algorithm) based in part on the received nonce and the shared key (e.g., a shared secret stored in hidden memory region 514) for transmission back to the memory 104.

At 914, the challenge-response can be received by the memory 104 to facilitate authentication of the processor 102. At 916, a determination can be made regarding whether the processor 102 can be authenticated. For example, memory 104 can be associated with controller component 208, which can facilitate decrypting the challenge-response (e.g., via the shared key and a corresponding decryption algorithm), upon receiving the challenge-response from processor 102. If the controller component 208 associated with memory 104 can successfully decrypt the challenge-response, it can be determined that the message received was based on the nonce that was initially sent to the processor 102, thus verifying that the processor 102 is in possession of the shared secret. As a result, the memory 104 can determine and/or infer that the processor is intended or authorized, thereby authenticating the memory 104.

Once the memory 104 and the processor 102 have mutually authenticated the other, a secure link 112 or root trust can be provided between the processor 102 and the memory 104.

At 918, a determination of the authenticity of instructions and/or data associated with processor 102 can be made. For example, in one aspect of the disclosed subject matter, firmware, or portions thereof, for the processor 102 can be stored in the memory 104, for example, in an accessible memory portion (e.g., firmware memory region 516) of the memory 104. In another aspect of the disclosed subject matter, data and/or parameters, or portions thereof, for the processor 102 can be stored in the memory 104, for example, in an accessible memory portion (e.g., firmware memory region 516) of the memory 104.

In yet another aspect of the disclosed subject matter, the contents stored in the accessible memory portion (e.g., firmware memory region 516) of the memory 104 can be, for example, encrypted or otherwise obscured and/or protected. Thus, the memory 104, which can be associated with controller component 208, can facilitate accessing firmware memory region 516 and hidden memory region 514 to facilitate decrypting and/or verifying the authenticity of (e.g., via cryptographic and/or authentication information stored in hidden memory region 514) the contents of firmware memory region 516. Thus, if it is determined at 918 that the processor instructions and/or data are authentic, at 920, access to at least a subset of the memory 104 can be granted. For example, if contents of firmware memory region 516 is determined to be authentic, then access can be granted to firmware memory region 516 to, for example, processor 102 to facilitate higher level functions of processor 102.

In accordance with a further aspect of the disclosed subject matter, if it is determined the mutual authentication fails (e.g., if at 908, the memory 104 is not authenticated, or if at 916, the processor 102 is not authenticated), or if it is determined at 918, that the processor instructions and/or data are not authentic (e.g., if the memory 104 contents are replaced with an unauthorized or unintended version by overwriting memory 104 or substituting the memory device), then at 922, access to at least a subset of the memory 104 can be denied. For example, if a malicious host attempts to circumvent the mutual authentication procedure, the mutual authentication can fail, and as a result of limiting access to firmware memory region 516, the methodology 900 can facilitate halting execution of further unauthorized functions by the processor 102.

As a result, the methodology 900 can facilitate securing memory operations (e.g., one or more of operations read, program, erase, etc.), ensuring memory 104 contents are genuine (e.g., authentication or verification of processor firmware stored in memory 104, or portions thereof), and decrypting encrypted processor firmware that can be stored in memory 104, or portions thereof.

Figure 10:
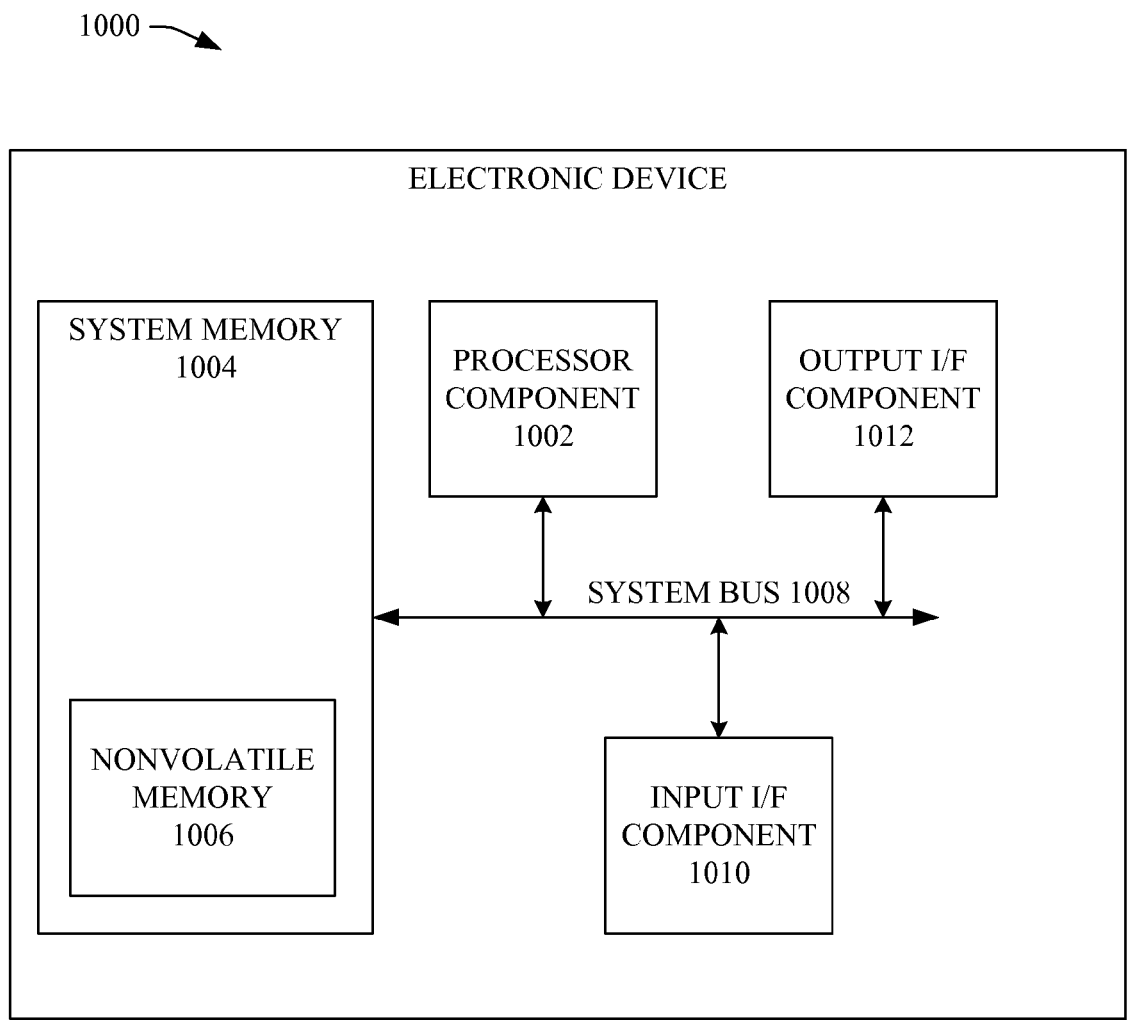
FIG. 10 illustrates an exemplary high-level block diagram of an electronic device suitable for incorporation of aspects of the disclosed subject matter.

Referring to FIG. 10, illustrated is a block diagram of an exemplary, non-limiting electronic device 1000 that can comprise and/or incorporate system 100, system 200, memory array 300A or 300B, system 400, system 500, and/or system 700, or a respective portion(s) thereof The electronic device 1000 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position system (GPS)), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1000 can include, but are not limited to, a processor component 1002 (e.g., which can be and/or can include the same or similar functionality as processor 102 and/or external system processor 702, as described herein), a system memory 1004, which can comprise a nonvolatile memory 1006 (e.g., which can be and/or can include the same or similar functionality as memory 104), and a system bus 1008 that can couple various system components including the system memory 1004 to the processor component 1002. The system bus 1008 can be any of several types of bus structures including a memory bus or memory controller, a peripheral bus, or a local bus using any of a variety of bus architectures.

Electronic device 1000 can typically include a variety of computer readable media. Computer readable media can be any available media that can be accessed by the electronic device 1000. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1006 (e.g., a flash memory which can be and/or can include the same or similar functionality as memory 104), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1000. Communication media typically embodies computer readable instructions, data structures, program modules or other data in a modulated data signal such as a carrier wave or other transport mechanism and includes any information delivery media.

The system memory 1004 can include computer storage media in the form of volatile (e.g., SRAM) and/or nonvolatile memory 1006 (e.g., flash memory). For example, nonvolatile memory 1006 can be the same or similar, or can contain the same or similar functionality, as memory 104 (e.g., as described herein with regard to system 100, system 200, system 400, etc.). A basic input/output system (BIOS), containing the basic routines that can facilitate transferring information between elements within electronic device 1000, such as during start-up, can be stored in the system memory 1004. The system memory 1004 typically also can contain data and/or program modules that can be accessible to and/or presently be operated on by the processor component 1002. By way of example, and not limitation, the system memory 1004 can also include an operating system(s), application programs, other program modules, and program data.

The nonvolatile memory 1006 can be removable or non-removable. For example, the nonvolatile memory 1006 can be in the form of a removable memory card or a USB flash drive, and can also be and/or can include the same or similar functionality as memory 104. In accordance with one aspect, the nonvolatile memory 1006 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1000 through input devices (not shown) such as a keypad, microphone, tablet, or touch screen although other input devices can also be utilized. These and other input devices can be connected to the processor component 1002 through input interface component 1010 that can be connected to the system bus 1008. Other interface and bus structures, such as a parallel port, game port or a universal serial bus (USB) can also be utilized. A graphics subsystem (not shown) can also be connected to the system bus 1008. A display device (not shown) can be also connected to the system bus 1008 via an interface, such as output interface component 1012, which can in turn communicate with video memory. In addition to a display, the electronic device 1000 can also include other peripheral output devices such as speakers (not shown), which can be connected through output interface component 1012.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "module," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A method that facilitates pairing of participants, comprising:
employing at least one processor to facilitate execution of code instructions retained in at least one memory device, the at least one processor, in response to execution of the code instructions, perform operations comprising:
authenticating a second participant by a first participant, wherein the first participant comprises a processor component and the second participant comprises a nonvolatile memory component;
authenticating the first participant by the second participant;
verifying authenticity of a set of operating system code that is stored in a secure memory region of a memory array of the nonvolatile memory component, based in part on a key and a set of code verification instructions that are stored in a hidden memory region of the memory array of the nonvolatile memory component, in response to the authenticating of the second participant by the first participant and the authenticating of the first participant by the second participant, to ensure the set of operating system code is an authorized version of operating system code, wherein the hidden memory region is accessible by a controller component of the nonvolatile memory component and is not accessible to the first participant including the processor component;

verifying authenticity of a second set of operating system code that is stored in the secure memory region, based in part on a second key and a second set of code verification instructions associated with a third participant that are stored in the hidden memory region, in response to authenticating the second participant by the third participant comprising a second processor component and authenticating the third participant by the second participant, to ensure the second set of operating system code is an authorized version of operating system code; and with respect to the processor component, controlling access to the secure memory region of the memory array of the nonvolatile memory component and the set of operating system code stored in the secure memory region by the processor component based in part on a result of the authenticating the second participant, a result of the authenticating of the first participant, and a result of the verifying of the authenticity of the set of operating system code, wherein the authenticating of the second participant, the authenticating of the first participant, and the verifying of the authenticity of the set of operating system code occur before granting access to the first participant that enables the processor component to access the secure memory region of the memory array of the nonvolatile memory component, and with respect to the second processor component, controlling access to the secure memory region of the memory array of the nonvolatile memory component and the second set of operating system code stored in the secure memory region by the second processor component based in part on a result of the authenticating the second participant, a result of the authenticating of the third participant, and a result of the verifying of the authenticity of the second set of operating system code, wherein the authenticating of the second participant, the authenticating of the third participant, and the verifying of the authenticity of the second set of operating system code occur before granting access to the second participant that enables the second processor component to access the secure memory region of the memory array of the nonvolatile memory component.

2. The method of claim 1, further comprising:
transmitting a challenge from one of the first participant or the second participant to the other of the first participant or the second participant to facilitate calculating a challenge-response based in part on the challenge and a shared secret, wherein the shared secret is shared at least between the first participant and the second participant; and
receiving the challenge-response in the one of the first participant or the second participant to facilitate the authentication of the other of the first participant or the second participant.

3. The method of claim 2, wherein the transmitting of the challenge further comprises transmitting a nonce.

4. The method of claim 1, further comprising storing a third key and a fourth key in the hidden memory region, wherein the third key facilitates the authenticating of the first participant, and the fourth key facilitates the authenticating of the second participant.

5. The method of claim 1, further comprising communicatively connecting the nonvolatile memory component with one of the processor component or the controller component to facilitate the authenticating of the first participant, the authenticating of the second participant, and the verifying of the authenticity of the set of operating system code.

6. The method of claim 1, further comprising storing at least a shared secret in a processor authentication memory and a firmware authentication memory of the hidden memory region of the nonvolatile memory component to facilitate the authenticating of the first participant or the authenticating of the second participant by the one of the processor component or the controller component.

7. The method of claim 1, wherein the nonvolatile memory component comprises at least one of a NOR flash memory or a NAND flash memory.

8. The method of claim 1, further comprising:
granting access to a portion of the nonvolatile memory in response to the result of the authenticating of the first participant, the result of the authenticating of the second participant, and the result of the verifying of the authenticity of the set of operating system code indicating that the processor component is authenticated by the nonvolatile memory, the nonvolatile memory is authenticated by the processor component, and the authenticity of the set of operating system code has been verified; and
denying access to the portion of the nonvolatile memory in response to the result of the authenticating of the first participant, the result of the authenticating of the second participant, and the result of the verifying of the authenticity of the set of operating system code indicating at least one of a failure in the authenticating of the processor component by the nonvolatile memory, a failure in the authenticating of the nonvolatile memory by the processor component, or a failure of the verifying of the authenticity of the set of operating system code.

9. The method of claim 1, further comprising:
encrypting the set of operating system code using the key, wherein the key is a different key from the second key used to facilitate the verifying of the authenticity of the second set of operating system code that is stored in the secure memory region; and
storing the set of operating system code, in encrypted form, in the secure memory region.

10. The method of claim 9, further comprising halting execution of a function associated with the set of operating system code in response to determining that the authenticity of the set of operating system code is not verified.

11. The method of claim 9, further comprising storing cryptographic information in a firmware decryption memory of the hidden memory region to facilitate at least one of decrypting the set of operating system code, from its encrypted form, or the verifying of the authenticity of the set of operating system code, wherein the set of operating system code, in its encrypted form, is not decrypted for use in an executable form unless the set of operating system code is verified as the authorized version of the operating system code.

12. A system that facilitates pairing associated with a nonvolatile memory component, comprising:

at least one of a processor component configured to communicate a memory-challenge, to communicate a processor-challenge-response in response to receipt of a processor-challenge, and to verify authenticity of a memory-challenge-response to the memory-challenge, or a second processor component configured to communicate a second memory-challenge, to communicate a second processor-challenge-response in response to receipt of a second processor-challenge, and to verify authenticity of a second memory-challenge-response to the second memory-challenge;

the nonvolatile memory component, which is associated with at least one of the processor component or the second processor component, and configured to communicate the processor-challenge, to communicate the memory-challenge-response in response to receipt of the memory-challenge, and to verify authenticity of the processor-challenge-response to the processor-challenge, or configured to communicate the second processor-challenge, to communicate the second memory-challenge-response in response to receipt of the second memory-challenge, and to verify authenticity of the second processor-challenge-response to the second processor-challenge; and a controller component of the nonvolatile memory component that is configured to verify authenticity of firmware stored in a secure memory region of a memory array of the nonvolatile memory component, based in part on a set of firmware verification instructions that is stored in a hidden memory region of the memory array of the nonvolatile memory component, to ensure the firmware is an authorized version of firmware, wherein the hidden memory region is accessible by the controller component and is not accessible to at least one of the processor component or the second processor component, the firmware is associated with the processor component and second firmware is associated with the second processor component, and the controller component is further configured to control access, by at least one of the processor component or the second processor component, to the secure memory region and the firmware or the second firmware stored in the secure memory region based in part on a result of the verification of the authenticity of the memory-challenge-response to the memory-challenge, a result of the verification of the authenticity of the response to the processor-challenge, and a result of the verification of the authenticity of the firmware, or based in part on a result of the verification of the authenticity of the second memory-challenge-response to the second memory-challenge, a result of a verification of the authenticity of the second processor-challenge-response to the second processor-challenge, and a result of the verification of the authenticity of the second firmware, wherein the verification of the authenticity of the memory-challenge-response to the memory-challenge, the verification of the authenticity of the processor-challenge-response to the processor-challenge, and the verification of the authenticity of the firmware occur before granting access to the processor component to allow the processor component to access the secure memory region of the nonvolatile memory component, or wherein the verification of the authenticity of the second memory-challenge-response to the second memory-challenge, the verification of the authenticity of the second processor-challenge-response to the second processor-challenge, and the verification of the authenticity of the second firmware occur before granting access to the second processor component to allow the second processor component to access the secure memory region of the nonvolatile memory component, and wherein a first key that facilitates the verification of the authenticity of the firmware associated with the processor component and a second key that facilitates verification of authenticity of the second firmware associated with the second processor component are stored in the hidden memory region, and the controller component is further configured to verify the authenticity of the firmware based in part on the first key in response to the processor component being mutually authenticated with the nonvolatile memory component and verify the authenticity of the second firmware based in part on the second key in response to the second processor component being mutually authenticated with the nonvolatile memory component.

13. The system of claim 12, wherein the controller component is further configured to deny the processor component access to the secure memory region of the memory array of the nonvolatile memory component in response to the controller component identifying the firmware as being an unauthorized version of firmware.

14. The system of claim 12, wherein the nonvolatile memory component and the processor component each further comprise an authentication component comprising one or more of a nonce component and a counter component to facilitate generation of a nonce as the processor-challenge or the memory-challenge respectively.

15. The system of claim 12, wherein the nonvolatile memory component includes a plurality of memory portions comprising at least the hidden memory region for storing at least one of a shared secret of the processor and the nonvolatile memory component associated with the processor component or cryptographic information that facilitates data decryption or the verification of the authenticity of the firmware.

16. The system of claim 15, wherein the memory-challenge-response is based in part on the memory-challenge and the shared secret, or the processor-challenge-response is based in part on the processor-challenge and the shared secret.

17. An electronic device comprising the system of claim 12.

18. The electronic device of claim 17, wherein the electronic device further comprises at least one of a NOR flash memory or a NAND flash memory.

19. The electronic device of claim 18, wherein the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with motor vehicles, a global positioning system (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

* * * * *